(12) United States Patent  
Gupta

(10) Patent No.: US 9,021,462 B2  
(45) Date of Patent: Apr. 28, 2015

(54) SYSTEMS AND METHODS FOR PROVISIONING EQUIPMENT

(71) Applicant: Johnson Controls Technology Company, Holland, MI (US)

(72) Inventor: Vivek V. Gupta, Shorewood, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/802,324

(22) Filed: Mar. 13, 2013

(65) Prior Publication Data

US 2014/0282458 A1 Sep. 18, 2014

(51) Int. Cl.
G06F 9/445 (2006.01)
(52) U.S. Cl.
CPC .......................................... *G06F 8/65* (2013.01)
(58) Field of Classification Search
None
See application file for complete search history.

(56) References Cited

U.S. PATENT DOCUMENTS

| 7,821,218 | B2 | 10/2010 | Butler et al. |
| 2010/0298984 | A1 | 11/2010 | Mauk et al. |
| 2010/0298985 | A1 | 11/2010 | Hess et al. |
| 2013/0125107 | A1* | 5/2013 | Bandakka et al. ............ 717/171 |

* cited by examiner

Primary Examiner — Chuck Kendall
(74) Attorney, Agent, or Firm — Foley & Lardner LLP

(57) ABSTRACT

Systems and methods for provisioning building equipment are provided. A disclosed provisioning system includes a main control unit having a processing circuit, a memory device, and a data communications interface. The provisioning system further includes an auxiliary control unit and a portable data storage device. The portable data storage device is physically separate from the main control unit and has an update file stored therein. The update file includes a plurality of partitions, each partition including provisioning data and metadata. The main control unit identifies a first partition of the update file containing first provisioning data for the main control unit and a second partition of the update file containing second provisioning data for the auxiliary control unit. The processing circuit is configured to extract the provisioning data from the identified partitions and to apply the extracted provisioning data to the main control unit and the auxiliary control unit.

20 Claims, 13 Drawing Sheets

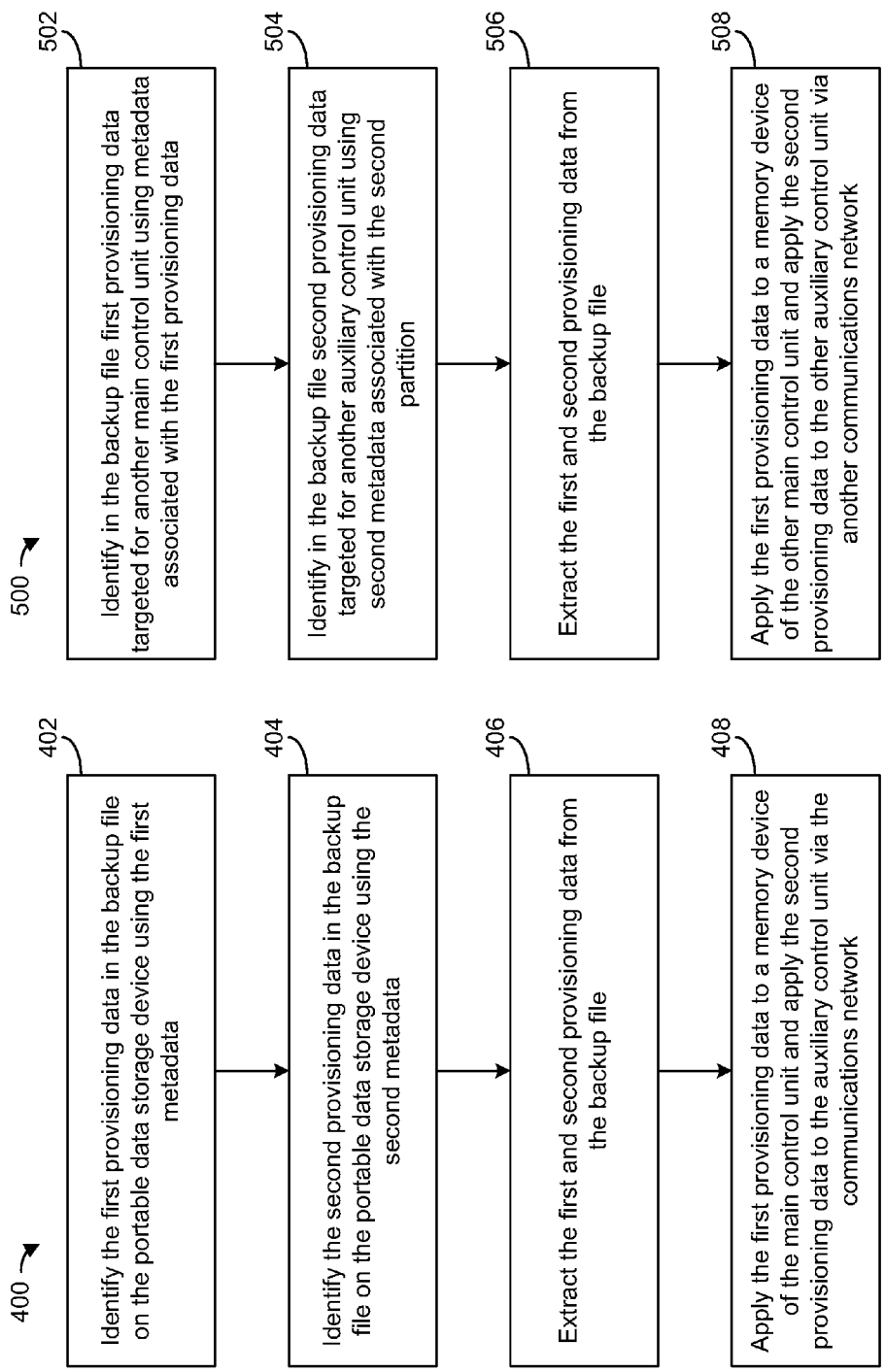

SYSTEMS AND METHODS FOR PROVISIONING EQUIPMENT

BACKGROUND

The present invention relates generally to the field of heating, ventilation, and air conditioning (HVAC) control systems. The present invention relates more particularly to systems and methods for updating a group of controllers in a HVAC control system.

HVAC control systems are used to monitor and control temperature, humidity, air flow, air quality, and/or other conditions within a building or building system. HVAC control systems typically include a plurality of measurement devices (e.g., temperature sensors, pressure sensors, flow sensors, etc.), control devices (e.g., chillers, boilers, air handling units, variable air volume units, etc.), and a controller for receiving feedback from the measurement devices and providing a control signal to the control devices. Some HVAC control systems include a main controller and one or more auxiliary controllers.

As improved control functionality is developed, it is often desirable to provision (i.e., update) existing HVAC control systems to include the improved functionality. Provisioning is the process of preparing and/or equipping a network (e.g., a network of HVAC controllers) to provide improved functionality or services to its users. Such provisioning is typically performed by updating the firmware and/or configuration settings used by the HVAC controllers.

Current provisioning methods require considerable resources and effort to update the firmware and/or configuration settings on a plurality HVAC controllers. For example, current provisioning methods typically require a service technician to update each controller independently or require the use of complex PC-based tools. These PC-based tools often rely on a secondary communications network (e.g., wired networks, the Internet, a cellular communications network, etc.) and are often difficult to utilize at the location of the HVAC control system (e.g., a rooftop, a basement, a remote location, etc.).

SUMMARY

One implementation of the present disclosure is a system for updating building equipment using a portable data storage device containing an update file. The system includes a main control unit having a processing circuit, a memory device, and a data communications interface. The system further includes one or more optional auxiliary control units connected with the main control unit via a communications network and a portable data storage device. The portable data storage device is physically separate from the main control unit and has an update file stored therein. The update file includes a plurality of partitions, each partition including provisioning data for a programmable component of the main control unit or an auxiliary control unit and associated metadata. In some embodiments, the update file includes a partition for each programmable component of the system (e.g., the main control unit, the auxiliary control unit(s), etc.). The processing circuit comprises a provisioning manager configured to identify a first partition of the update file containing first provisioning data targeted for the main control unit using first metadata associated with the first partition and to identify a second partition of the update file containing second provisioning data targeted for the auxiliary control unit using second metadata associated with the second partition. The processing circuit is configured to extract the provisioning data from the identified partitions of the update file and to apply the extracted provisioning data to the auxiliary control units via the communications network and to the programmable memory device of the main control unit.

In some embodiments, the main control unit includes a user interface element and the main control unit is configured to identify the partitions, extract the provisioning data, and apply or update the extracted provisioning data to the auxiliary control unit in response to an input received via the user interface element. In some embodiments, the main control unit extracts the provisioning data directly from the portable data storage device without an intermediate communications network between the main control unit and the portable data storage device.

In some embodiments, the portable data storage device does not include a user interface element and wherein the main control unit exercises exclusive control over the extraction of the provisioning data from the identified partitions without assistance from another device.

In some embodiments, each of the plurality of partitions contains a single type of provisioning data selected from a group consisting of executable firmware data, executable application data, and configuration data. In some embodiments, each of the plurality of partitions contains provisioning data for a single control unit selected from a group consisting of the main control unit and the auxiliary control unit.

In some embodiments, the metadata for each partition includes a device identifier indicating a device to which the provisioning data contained in the same partition is targeted. The provisioning manager may identify the partitions containing provisioning data targeted for the main control unit and for the auxiliary control units by comparing the device identifiers with identity attributes of the main control unit and the auxiliary control units.

In some embodiments, the metadata for each partition includes a version identifier indicating a version of the provisioning data contained in the same partition. The provisioning manager may identify the partitions containing updated provisioning data for the main control unit and the auxiliary control units by comparing the version identifiers with version attributes of existing provisioning data used by the main control unit and the auxiliary control units.

In some embodiments, the metadata for each partition includes validity metadata. The provisioning manager may be configured to validate the extracted provisioning data by generating a validity code based on the extracted provisioning data and comparing the generated validity code with the validity metadata.

Another implementation of the present disclosure is a method for updating building equipment. The method includes establishing a communications link between a main control unit and a portable data storage device physically separate from the main control unit. The portable data storage device includes an update file having a plurality of partitions, each partition containing provisioning data targeted for a programmable component of the main control unit or an auxiliary control unit and metadata associated with the provisioning data. The method further includes identifying a first partition of the update file containing first provisioning data for the main control unit and identifying a second partition of the update file containing second provisioning data for an auxiliary control unit connected with the main control unit via a communications network. The first partition is identified by a provisioning manager of the main control unit using metadata associated with the first partition and the second partition is identified by the provisioning manager using second metadata associated with the second partition. The method further includes extracting the first and second provisioning data from the first and second identified partitions, applying or updating the first provisioning data to a memory device of the main control unit, and applying or updating the second provisioning data to the auxiliary control unit via the communications network.

In some embodiments, the method further includes receiving an input via a user interface element of the main control unit. The provisioning manager may identify the first and second partitions, extract the first and second provisioning data from the first and second identified partitions, and apply the extracted provisioning data to the memory device and to the auxiliary control unit in response to the input received via the user interface element.

In some embodiments, each of the plurality of partitions contains a single type of provisioning data selected from a group consisting of firmware data, application data, and configuration data. In some embodiments, each of the plurality of partitions contains provisioning data for a single control unit selected from a group consisting of the main control unit and the auxiliary control unit.

In some embodiments, the metadata for each partition includes a device identifier indicating a device to which the provisioning data contained in the same partition is targeted. In such embodiments, the method may further include comparing the device identifiers with identity attributes of the main control unit and the auxiliary control unit. The provisioning manager may identify the partitions containing provisioning data targeted for the main control unit and for the auxiliary control unit based on a result of the comparison.

In some embodiments, the metadata for each partition includes a version identifier indicating a version of the provisioning data contained in the same partition. In such embodiments, the method may further include comparing the version identifiers with version attributes of existing provisioning data used by the main control unit and the auxiliary control unit. The provisioning manager may identify the partitions containing updated provisioning data for the main control unit and the auxiliary control unit based on a result of the comparison.

In some embodiments, the metadata for each partition includes validity metadata. In such embodiments, the method may further include generating a validity code based on the extracted provisioning data, comparing the generated validity code with the validity metadata, and determining whether the extracted provisioning data is valid based on the comparison.

Another implementation of the present disclosure is method for provisioning building equipment. The method includes identifying first provisioning data currently in use by a main control unit and identifying second provisioning data currently use by an auxiliary control unit connected with the main control unit via a communications network. The first and second provisioning data are identified using a provisioning manager of the main control unit. The method further includes receiving, into a memory device of the main control unit, the second provisioning data from the auxiliary control unit, generating first metadata based on the first provisioning data and generating second metadata based on the second provisioning data. The method further includes generating a backup file containing the first provisioning data, the first metadata, the second provisioning data, and the second metadata. The method further includes establishing a communications link between the main control unit and a portable data storage device physically separate from the main control unit and copying the backup file to the portable data storage device.

In some embodiments, the method further includes receiving an input via a user interface element of the main control unit. The provisioning manager may identify the first and second provisioning data, receive the second provisioning data, generate the first and second metadata, generate the backup file, and copy the backup file to the portable data storage device in response to the input received via the user interface element.

In some embodiments, each of the plurality of partitions contains a single type of provisioning data selected from a group consisting of firmware data, application data, and configuration data. In some embodiments, the metadata for each partition includes a device identifier indicating a device to which the provisioning data contained in the same partition applies.

In some embodiments, the method further includes restoring the first and second provisioning data from the backup file to the main control unit and the auxiliary control. The restoration process includes identifying the first and second provisioning data in the backup file on the portable data storage device. The first provisioning data is identified by the provisioning manager using the first metadata and second provisioning data is identified by the provisioning manager using the second metadata. The restoration process further includes extracting the first and second provisioning data from the backup file, applying the first provisioning data to a memory device of the main control unit, and applying the second provisioning data to the auxiliary control unit via the communications network.

In some embodiments, the method further includes cloning the first and second provisioning data from the backup file to another main control unit and another auxiliary control unit connected with the other main control unit via another communications network. The cloning process includes identifying in the backup file stored on the portable data storage device first provisioning data targeted for the main control unit and identifying in the backup file stored on the portable data storage device second provisioning data targeted for the other auxiliary control unit. The first provisioning data is identified by a provisioning manager of the other main control unit using metadata associated with the first provisioning data and the second provisioning data is identified by the other provisioning manager using second metadata associated with the second provisioning data. The cloning process further includes extracting the first and second provisioning data from the backup file, applying the first provisioning data to a memory device of the other main control unit, and applying the second provisioning data to the other auxiliary control unit via the other communications network.

Another implementation of the present disclosure is one or more non-transitory computer-readable media (e.g., memory modules) having instructions stored therein. The computer readable media are part of a main control unit. The instructions are executable by one or more processors of the main control unit and, when executed, cause the one or more processors to perform actions including establishing a communications link between a main control unit and a portable data storage device physically separate from the main control unit. The portable data storage device includes an update file having a plurality of partitions, each partition containing provisioning data and metadata. The computer-readable media further include instructions for identifying a first partition of the update file containing first provisioning data targeted for the main control unit and identifying a second partition of the update file containing second provisioning data targeted for an auxiliary control unit connected with the main control unit via a communications network. The first partition is identified by a provisioning manager of the main control unit using metadata associated with the first partition and the second partition is identified by the provisioning manager using second metadata associated with the second partition. The computer-readable media further include instructions for extracting the first and second provisioning data from the first and second identified partitions, applying the first provisioning data to a memory device of the main control unit, and applying the second provisioning data to the auxiliary control unit via the communications network.

BRIEF DESCRIPTION OF THE DRAWINGS

FIG. 10A is a flowchart of a process for restoring a system configuration from the backup file generated by the process of FIG. 9A, according to an exemplary embodiment.

FIG. 11A is a flowchart of a process for cloning a system configuration using the backup file generated by the process of FIG. 9A, according to an exemplary embodiment.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, systems and methods for provisioning equipment in a building management system (BMS) and components thereof are shown, according to various exemplary embodiments. Provisioning is the process of preparing, equipping, upgrading, and/or updating a network to provide improved functionality or services to its users. The systems and methods described herein may be used to update the firmware, configuration settings, and/or application data (e.g., control logic) for a plurality of control units in a building management system.

Advantageously, an entire network of interconnected control units (e.g., a main control unit and a plurality of auxiliary control units) may be updated by providing a single update file to one of the control units (e.g., the main control unit) via a portable data storage device (e.g., a USB Flash drive, a SD memory card, a portable hard drive, a PDA, a mobile phone storing an update file, etc.). The update file may include a plurality of partitions, each partition containing metadata and provisioning data. The metadata may identify a specific control unit (e.g., by name, by type, etc.) and the provisioning data may include firmware updates, configuration updates, or application updates for the identified control unit.

The main control unit includes a provisioning manager configured to identify the partitions of the update file containing provisioning data for the main control unit and the auxiliary control units (e.g., using the metadata associated with each partition). The provisioning manager may be configured to extract the provisioning data from the identified partitions and to apply the extracted provisioning data to the main control unit and the auxiliary control units. The provisioning data for each of the auxiliary control units may be provided to the auxiliary control units over a pre-existing communications network such as BACnet SA bus or other communications network used by the building management system.

Advantageously, a user may initiate the provisioning process through an onboard user interface of the main control unit (e.g., by inserting the portable data storage device and selecting an update option). Once the provisioning process is initiated, each of the control units may be updated automatically without requiring further user interaction and without requiring additional update tools (e.g., a PC-based update tool, a web browser interface, etc.) to accomplish the provisioning process.

Figure 1:
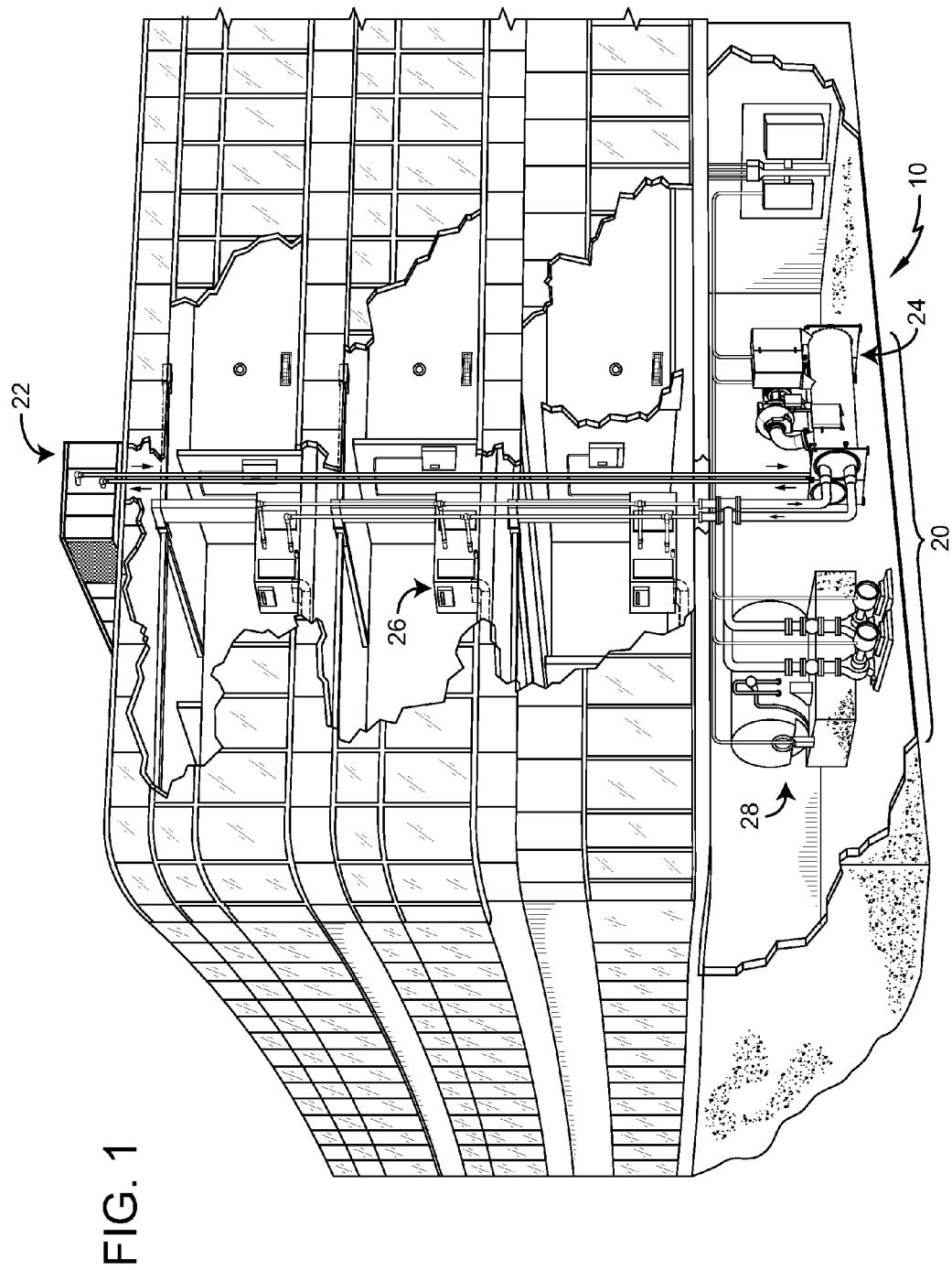
FIG. 1 is a perspective view of a building management system (BMS) implemented in a building and shown to include a plurality of BMS devices, according to an exemplary embodiment.

Referring now to FIG. 1, a perspective view of a building 10 is shown, according to an exemplary embodiment. Building 10 is shown to include a building management system (BMS) 20. BMS 20 can include a heating, ventilation, and air conditioning (HVAC) system, a security system, a lighting system, a fire alerting system, an elevator system, a water management system, a food storage system, a telephone system, another system that is capable of managing building functions or devices, or any combination thereof. In some implementations, BMS 20 may be a METASYS® brand building management system as sold by Johnson Controls, Inc.

BMS 20 is shown to include a plurality of BMS devices 22-28 (e.g., rooftop unit 22, air handling unit 24, variable air volume unit 26, and boiler 28). In some embodiments, BMS 20 may include any number of BMS devices in addition to or in place of BMS devices 22-28. For example, potential BMS devices may include measurement devices (e.g., temperature sensors, pressure sensors, flow sensors, etc.), control devices (e.g., actuators, chillers, boilers, air handling units, variable air volume units, etc.), control units (e.g., a main control unit, an auxiliary control unit, a process controller, a supervisory controller, etc.), or other devices for monitoring and controlling any variable condition or state of building 10. BMS devices may be positioned within building 10 (e.g., in a basement, in a building zone, etc.), outside building 10 (e.g., a lighting system, a security system, etc.), or above building 10 (e.g., rooftop unit 22). A service technician may easily provision these and other types of BMS devices using the systems and methods described herein (e.g., by physically connecting a portable data storage device to one of the BMS devices and initiating the provisioning process via an onboard user interface of the connected BMS device).

Figure 2:
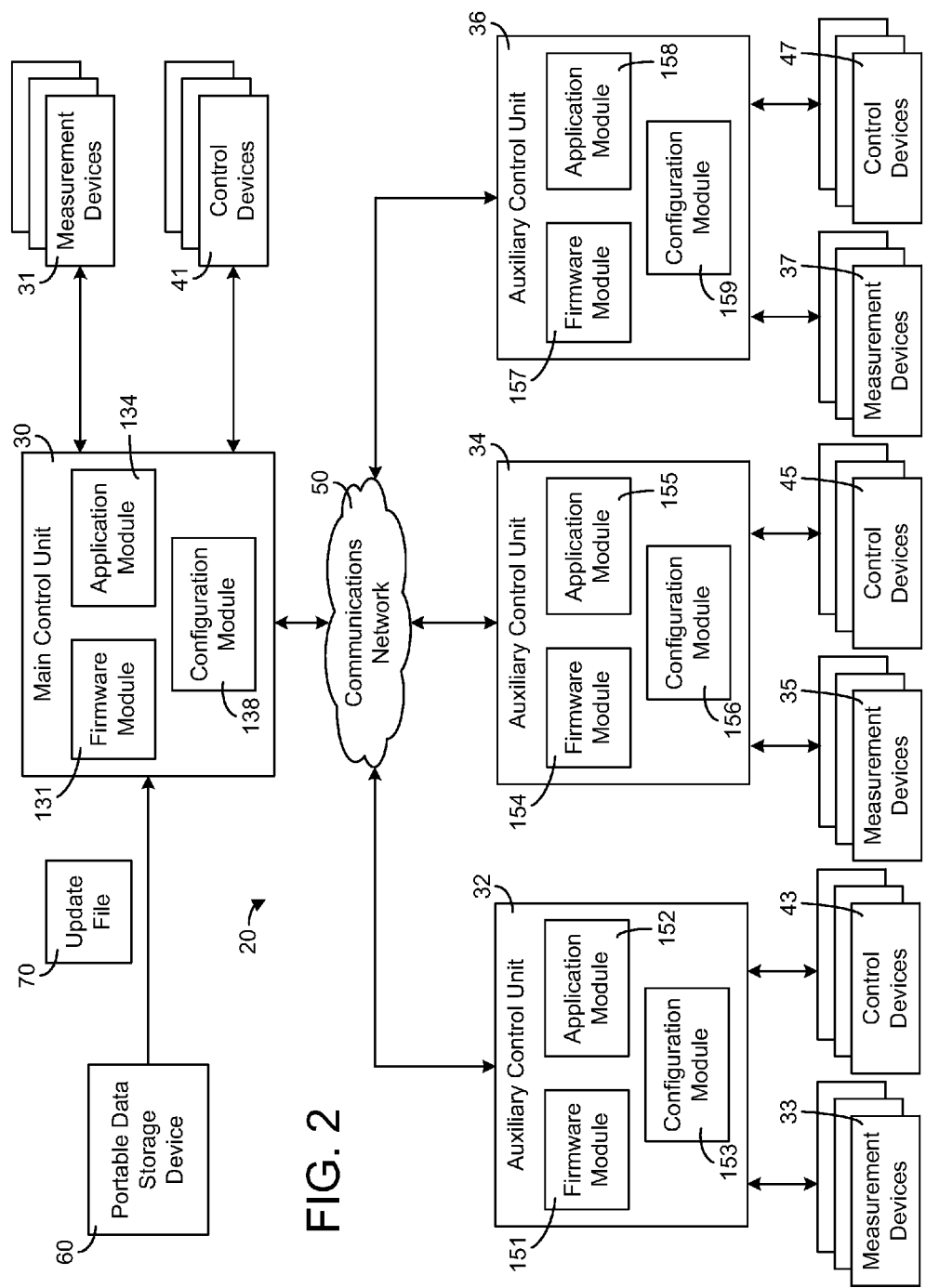
FIG. 2 is a block diagram of a system for updating building equipment such as the BMS devices illustrated in FIG. 1, according to an exemplary embodiment. The system is shown to include a main control unit, a plurality of auxiliary control units connected with the main control unit via a communications network, and a portable data storage device.

Referring now to FIG. 2, a block diagram of BMS 20 is shown, according to an exemplary embodiment. BMS 20 is shown to include a main control unit 30 and a plurality of auxiliary control units 32-36 (e.g., auxiliary control unit 32, auxiliary control unit 34, and auxiliary control unit 36). Although FIG. 2 shows three auxiliary control units, a greater or lesser number of auxiliary control units may be present in various implementations.

In some embodiments, main control unit 30 and auxiliary control units 32-36 may be part of a single control unit. Main control unit 30 and auxiliary control units 32-36 may work together to provide various control functions for the single control unit. For example, main control unit 30 may be a primary controller for rooftop unit 22. Auxiliary control units 32-36 may provide supplemental functionality for main control unit 30 and/or facilitate more efficient control over rooftop unit 22. In some embodiments, auxiliary control unit 32 may be an economizer for rooftop unit 22, auxiliary control unit 34 may provide fault detection and diagnostics for rooftop unit 22, and auxiliary control unit 36 may provide four-stage heating and cooling functionality for rooftop unit 22.

In some embodiments, main control unit 30 and auxiliary control units 32-36 may control different types of systems within BMS 20. For example, main control unit 30 may control a HVAC system, auxiliary control unit 32 may control a lighting system, auxiliary control unit 34 may control a security system, and auxiliary control unit 36 may control a water system. In other embodiments, main control unit 30 and auxiliary control units 32-36 may control a single type of system (e.g., a HVAC system, a lighting system, etc.) within BMS 20. In some embodiments, main control unit 30 and auxiliary control units 32-36 may each control a discrete portion of building 10 (e.g., a different floor, a different building zone, etc.). In other embodiments, main control unit 30 and auxiliary control units 32-36 may work together to control a shared portion of building 10.

In some embodiments, main control unit 30 and auxiliary control units 32-36 may not be connected with a supervisory controller or an outside network (e.g., the Internet, a LAN, etc.). For example, in some embodiments, main control unit 30 and auxiliary control units 32-36 may not be part of a complete building management system. In some embodiments, main control unit 30 and auxiliary control units 32-36 are connected to each other via a local communications network (e.g., a BACnet sensor/actuator network) but not to other BMS devices or subsystems. For example, main control unit 30 and auxiliary control units 32-36 may communicate only with each other and the various measurement devices and control devices connected thereto.

Still referring to FIG. 2, main control unit 30 and auxiliary control units 32-36 are shown receiving inputs from measurement devices 31, 33, 35, and 37 and providing control signals to control devices 41, 43, 45, and 47. For example, main control unit 30 is shown receiving input signals from measurement devices 31 and providing control signals to control devices 41. Auxiliary control unit 32 is shown receiving inputs from measurement devices 33 and providing control signals to control devices 43. Auxiliary control unit 34 is shown receiving inputs from measurement devices 35 and providing control signals to control devices 45. Auxiliary control unit 36 is shown receiving inputs from measurement devices 37 and providing control signals to control devices 47.

Measurement devices 31, 33, 35, and 37 may be temperature sensors, pressure sensors, flow sensors, lighting sensors, or any other type of measurement device. Control devices 41, 43, 45, and 47 may be actuators, chillers, boilers, air handling units, variable air volume units, or any other type of device capable of exercising control over a variable state or condition observed by measurement devices 31, 33, 35, and 37. Main control unit 30 and auxiliary control units 32-36 may utilize any type of control methodology (e.g., feedback control, model predictive control, pattern recognition adaptive control, PID control, feed-forward control, open loop control, etc.) to translate an input signal (e.g., a setpoint, a feedback signal, an error signal, etc.) into a control signal for control devices 41, 43, 45, and 47.

Still referring to FIG. 2, BMS 20 is shown to further include a communications network 50. Communications network 50 may be used to connect main control unit 30 with auxiliary control units 32-36. In some embodiments, communications network 50 may use the Building Automation and Control networks (BACnet) communications protocol to send and receive data between main control unit 30 and auxiliary control units 32-36. The BACnet protocol defines a number of services that are used to communicate between BMS devices. For example, BACnet services may include device and object discovery services (e.g., "Who-Is," "I-Am," "Who-Has," "I-Have," etc.) for identifying and mapping BMS devices. BACnet services may further include data sharing services (e.g., "Read-Property," "Write-Property," etc.) for sending and receiving provisioning data (e.g., firmware updates, application updates, configuration settings, etc.) between main control unit 30 and auxiliary control units 32-36.

As shown in FIG. 2, main control unit 30 may receive an update file 70 from a portable data storage device 60. Device 60 is physically separate from main control unit 30 (e.g., not an integral component of main control unit 30) and portable such that it can easily be carried to main control unit 30 (e.g., by a service technician). In some embodiments, portable data storage device 60 may communicate with main control unit 30 via a USB connection or another "plug-in" connection. For example, a user may insert data storage device 60 into a USB port of main control unit 30. In other embodiments, portable data storage device 60 may be inserted into a memory card slot of main control unit 30. In further embodiments, device 60 may communicate with control unit 30 via an Ethernet connection, another hardwired connection, or a wireless data connection (e.g., WiFi, cellular, Bluetooth®, etc.).

In some embodiments, main control unit 30 may read update file 70 from portable data storage device 60 (e.g., without non-transitorily coping update file 70) or may receive the entire update file 70 from portable data storage device 60. In other embodiments, main control unit 30 may receive only a portion of update file 70 from portable data storage device 60. Advantageously, update file 70 may include a plurality of partitions. Each partition may include a metadata portion and a provisioning data portion. The metadata portion may identify the type of device to which the provisioning data portion applies (e.g., a type of control unit, a type of BMS device, etc.) and/or a version of the provisioning data contained in the provisioning data portion. In some embodiments, main control unit 30 may identify the partitions containing updated provisioning data for the control units available within BMS 20 and selectively download only the identified partitions. This identification and selective downloading may advantageously shorten provisioning time by reducing an amount of data transferred from portable data storage device 60 to main control unit 30.

Advantageously, main control unit 30 may use the provisioning data to update both itself and auxiliary control units 32-36. Main control unit 130 may update itself by writing the provisioning data from applicable partitions (e.g., partitions identified as applying to main control unit 130) to the corresponding memory modules of main control unit 30. For example, firmware data may be written to a firmware module 131, application data may be written to an application module 134, and configuration data may be written to a configuration module 138.

Main control unit 30 may update auxiliary control units 32-36 by communicating the provisioning data corresponding to each of auxiliary control units 32-36 to the appropriate auxiliary control unit via communications network 50. For example, provisioning data corresponding to auxiliary control unit 32 may be communicated to auxiliary control unit 32, provisioning data corresponding to auxiliary control unit 34 may be communicated to auxiliary control unit 34, and provisioning data corresponding to auxiliary control unit 36 may be communicated to auxiliary control unit 36.

Upon receiving provisioning data from main control unit 30, each of auxiliary control units 32-36 may write the provisioning data to corresponding memory modules contained within each auxiliary control unit. For example, auxiliary control unit 32 may write firmware data to firmware module 151, application data to application module 152, and configuration data to configuration module 153. Auxiliary control unit 34 may write firmware data to firmware module 154, application data to application module 155, and configuration data to configuration module 156. Auxiliary control unit 36 may write firmware data to firmware module 157, application data to application module 158, and configuration data to configuration module 159.

Advantageously, a user may initiate the provisioning process through an onboard user interface of main control unit 30. Once the provisioning process is initiated, each device for which provisioning data was downloaded may be updated automatically without requiring further user interaction. The provisioning process may be completed without requiring additional update tools (e.g., a PC-based update tool, a web browser interface, etc.) outside of main control unit 30.

Figure 3:
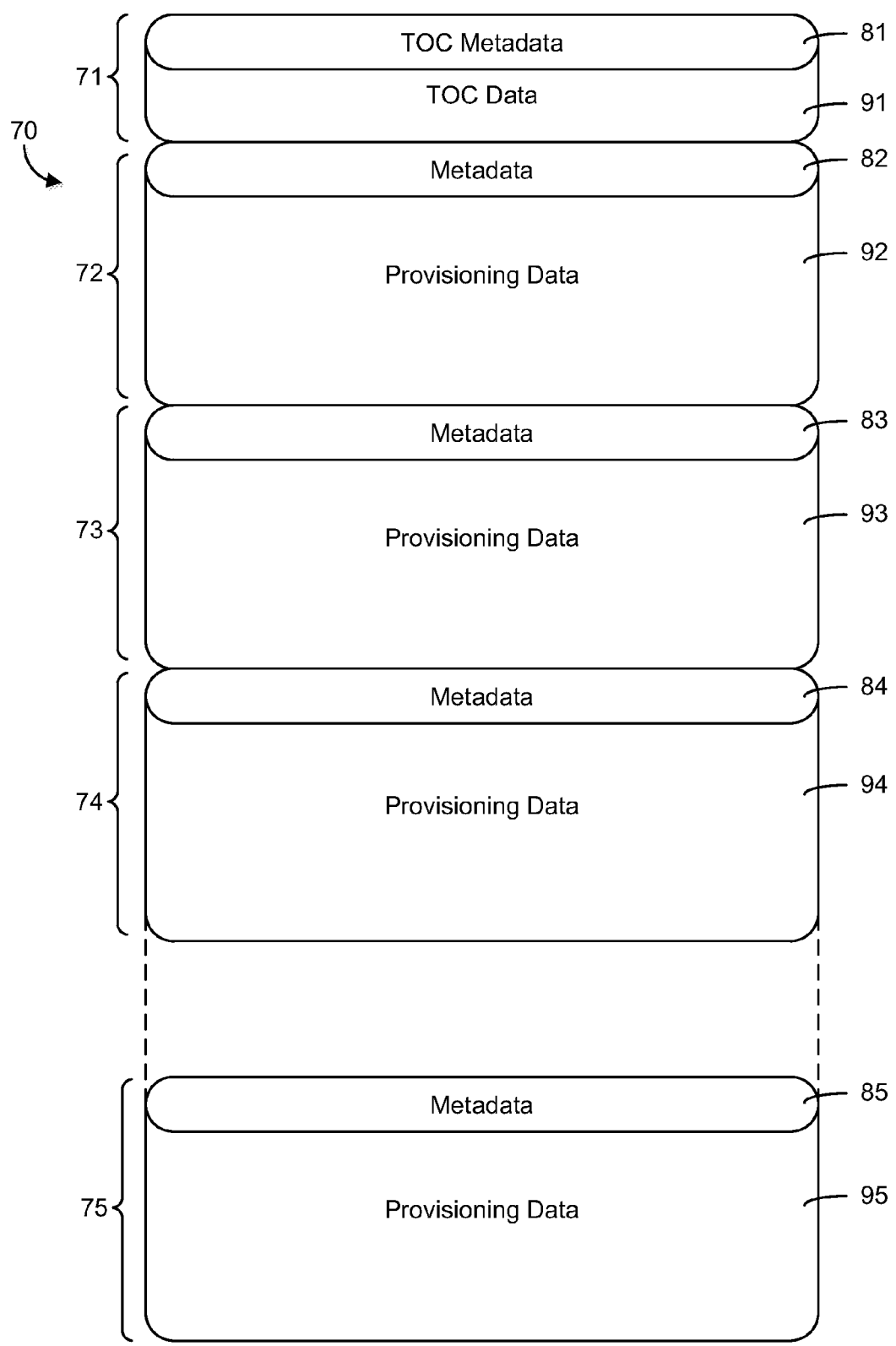
FIG. 3 is a block diagram of an update file used by the system of FIG. 2 to update the building equipment, according to an exemplary embodiment. The update file is shown to include a table of contents (TOC) partition and a plurality of file partitions.

Referring now to FIG. 3, a detailed block diagram of update file 70 is shown, according to an exemplary embodiment. Update file 70 is shown to include a table of contents (TOC) partition 71 and a plurality of file partitions 72-75 (e.g., a first file partition 72, a second file partition 73, a third file partition 74, and a Nth file partition 75). Any number of file partitions may be present. Each of file partitions 72-75 is shown to include a metadata portion (e.g., first metadata 82, second metadata 83, third metadata 84, and Nth metadata 85) and a provisioning data portion (e.g., first provisioning data 92, second provisioning data 93, third provisioning data 94, and Nth provisioning data 95).

Advantageously, file partitions 72-75 may be independent partitions. By partitioning provisioning data 92-95 into separate file partitions 72-75, main control unit 30 may identify and extract a subset of provisioning data 92-95 from portable data storage device 60. Main control unit 30 may identify each partition using the metadata associated with each partition. In some embodiments, if a partition is identified as containing provisioning data for a device not available within BMS 20, main control unit 30 may not download the partition. Similarly, if a partition is identified as containing provisioning data which is not an update for any device of BMS 20 (e.g., the contained provisioning data is an older version or the same version of provisioning data already in use), main control unit 30 may not download the partition. Main control unit 30 may query each of auxiliary control units 32-36 (e.g., using the "Who-Is" or "Read-Property" BACnet service) to identify the type of control units available on the network (e.g., BMS 20) and/or the versions of provisioning data already in use by auxiliary control units 32-36.

Provisioning data 92-95 may include firmware data, application data, configuration data, or any combination thereof. In some embodiments, provisioning data for different BMS devices (e.g., main control unit 30, auxiliary control unit 32, auxiliary control unit 34, auxiliary control unit 36, etc.) may be separated into different partitions. In some embodiments, provisioning data of different types (e.g., firmware, application, configuration, etc.) may be separated into different partitions. In some embodiments, each of file partitions 72-75 may contain provisioning data of a specific type for a specific BMS device. For example, first provisioning data 92 may be firmware data for main control unit 30, second provisioning data 93 may be application data for main control unit 30, third provisioning data 94 may be firmware data for auxiliary control unit 32, and Nth provisioning data 95 may be configuration data for auxiliary control unit 32.

Each of metadata portions 82-85 may describe a corresponding provisioning data portion 92-95. For example, first metadata 82 may describe first provisioning data 92, second metadata 83 may describe second provisioning data 93, third metadata 84 may describe third provisioning data 94, and Nth metadata 85 may describe Nth provisioning data 95. Metadata portions 82-85 may be file headers, footers, or otherwise located descriptive data within partitions 72-75.

Figure 4:
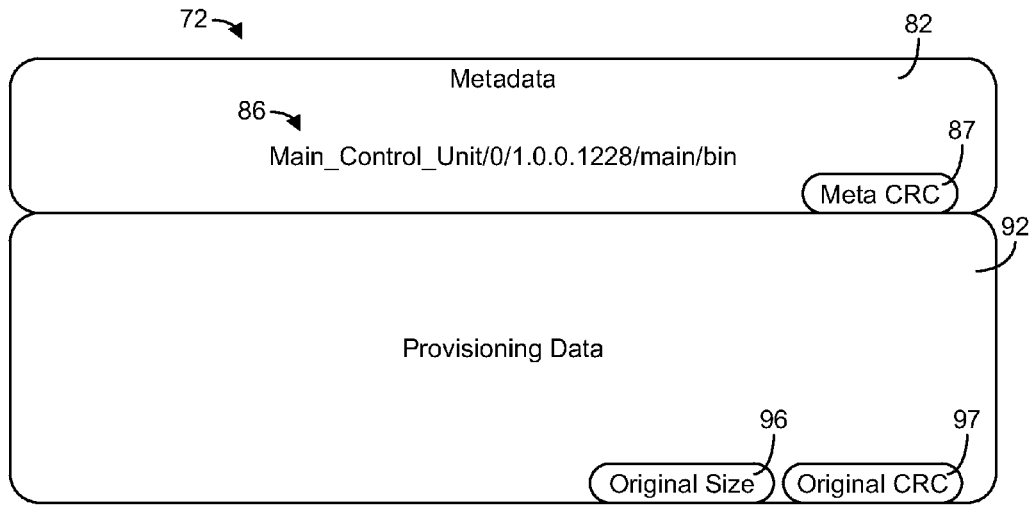
FIG. 4 is a detailed block diagram of one of the file partitions of the update file shown in FIG. 3, according to an exemplary embodiment. The file partition is shown to include a metadata portion and a provisioning data portion.

Referring now to FIG. 4, a detailed block diagram of file partition 72 is shown, according to an exemplary embodiment. File 72 partition is shown to include a metadata portion 82 and a provisioning data portion 92. In some embodiments, provisioning data 92 may be compressed using a lossless compression utility (e.g., a "Zlib" library, a "sec_zlib" library, etc.) implementing any well known lossless compression algorithms (e.g., the "gzip" lossless compression algorithm, etc.). This compression may occur prior to assembling provisioning data 92-95 into packaged update file 70. In some embodiments, the compression utility may support file encryption for enhanced security. The compression utility may convert an uncompressed binary data component (e.g., a firmware image, an application archive, etc.) into a compressed provisioning data component (e.g., provisioning data 92) having a smaller file size than the uncompressed binary data.

In some embodiments, the compression utility may append an original file size (e.g., a file size of the uncompressed data) and/or a cyclic redundancy check (CRC) code to each compressed provisioning data component 92-95. For example, provisioning data 92 is shown to include an original file size 96 and an original CRC code 97. In some embodiments, main control unit 30 may receive provisioning data 92 in the compressed format. Main control unit 30 may decompress and/or extract provisioning data 92 upon receiving such data from portable data storage device 60. In some embodiments, main control unit 30 may validate the extracted provisioning data to ensure that no extraction or decompression errors have occurred. The validation process may include comparing original file size 96 and/or original CRC code 97 with the a file size and/or CRC code size of the extracted provisioning data. The CRC code of the extracted provisioning data may be generated by main control unit 30 upon extracting such data.

In some embodiments, metadata 82 may be uncompressed data. Metadata 82 may be readable by main control unit 30 without extracting, decoding, or decompressing metadata 82 or provisioning data 92. In some embodiments, the compression utility may append a CRC code to each of metadata portions 82-85. For example, metadata 82 is shown to include a metadata CRC code 87. In some embodiments, main control unit 30 may validate metadata 82 to ensure that no read/write errors have occurred. The validation process may include comparing metadata CRC code 87 with a CRC code generated by main control unit 30 based on the metadata actually received from portable data storage device 60.

In some embodiments, metadata portions 82-85 may include an image name string. The image name string may provide specific context for the provisioning data in the corresponding provisioning data portion 92-95. For example, the image name string may include a device model name string, a device index sting, a device version number, an image file name, and an image file type. Each string may be separated by a delimiter (e.g., a period, a comma, a colon, a slash, etc.). An example of a generic image name string is as follows:

<Device_Model_Name>/<Index>/<Version>/<Image_File>/<Type>

The device model name may indicate a model name of the target BMS device to which the provisioning data applies (e.g., main control unit 30, auxiliary control unit 32, etc.). The index may represent a hardware address of the target BMS device to which the provisioning data will be written. The device version number may represent a hardware version of the target BMS device. The image file name may indicate a name of the provisioning data included in the corresponding provisioning data portion 92-95 (e.g., main firmware, boot firmware, configuration settings, etc.). The image file type may represent a type of data structure in the corresponding provisioning data portion 92-95 (e.g., binary data, parameter data, etc.). An example of a potential image name string 86 is shown in FIG. 4

In some embodiments, metadata portions 82-85 may include additional information regarding the provisioning data contained in the corresponding provisioning data portion 92-95. Such additional information may include a name of the original source file (e.g., the original provisioning data file name before being packaged and renamed as shown above), a time stamp of the original source file, a date stamp of the original source file, and/or a CRC code. The CRC code may be based on the other metadata included in metadata portions 82-85 and may be used to validate metadata portions 82-85.

Figure 5:
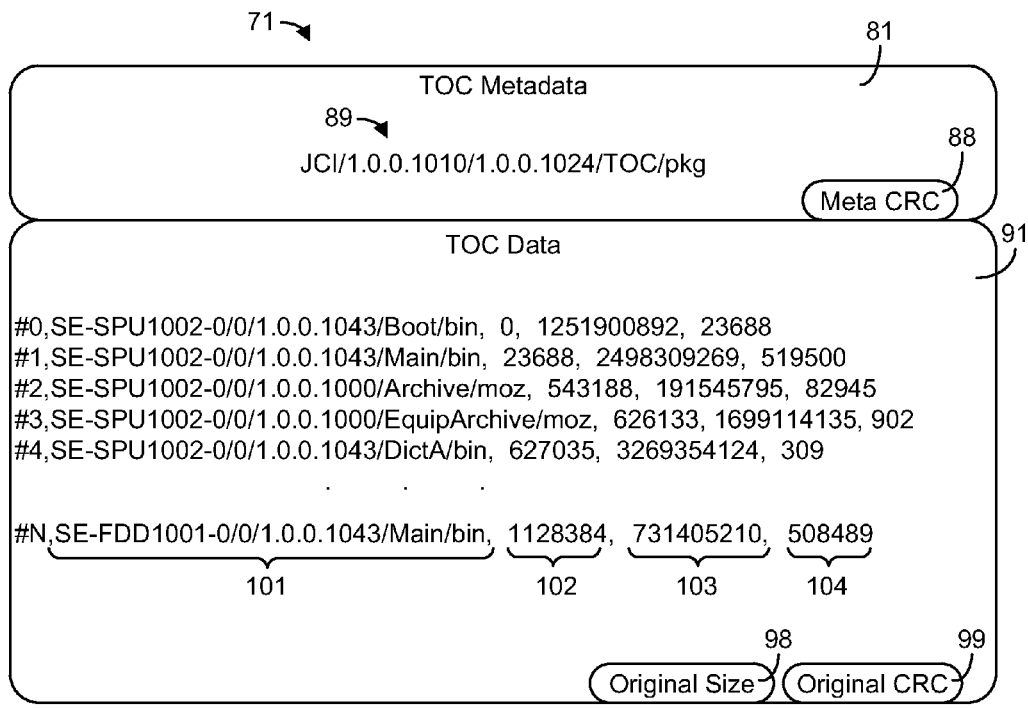
FIG. 5 is a detailed block diagram of the TOC partition of the update file shown in FIG. 3, according to an exemplary embodiment. The TOC partition is shown to include a TOC metadata portion and a TOC data portion.

Referring now to FIG. 5, a detailed block diagram of TOC partition 71 is shown, according to an exemplary embodiment. TOC partition 71 is shown to include a TOC metadata 81 and a TOC data 91. The structure of TOC partition 71 may be similar or the same as the structure of file partitions 72-75. In some embodiments, TOC metadata 81 may include an image name string. The image name string may provide specific context for the data contained in TOC data 91. The TOC metadata image name sting may include a producer name, a tool version, a system package version, a TOC file name, and a file type. An example of a generic image name string is as follows:

<Producer>/<Tool_Ver>/<Sys_Pkg_Ver>/<TOC_File>/<Type>

The producer name may be a name of the entity that created update file 70 (e.g., JCI, Johnson Controls, etc.). The tool version may be a version of the packing toolset used to create update file 70. The system package version may be a version of update file 70. The system package version may represent an overall version of update file 70. The system package version may change each time a partition is added, removed, or updated with new provisioning data. The system package version may be used by main control unit 30 in determining whether the provisioning data contained in update file 70 qualifies as an update to any of the currently installed components (e.g., the current firmware data, application data, and configuration data used by the networked BMS devices). The TOC file name may be internal name of the TOC file comprising TOC data 91. The file type may be a string representing an extension type of update file 70 (e.g., a .pkg "package" file, etc.). An example of a potential TOC image name string 89 is shown in FIG. 5.

Still referring to FIG. 5, TOC data 91 may contain a table of contents for update file 70. TOC data 91 may contain information relating to each partition included in update file 70. For example, TOC data 91 is shown to include an image name string 101 for each provisioning data portion 92-95. Main control unit 30 may use image name string 101 to identify the type of BMS device to which the provisioning data applies as well as the version of provisioning data included in update file 70 for the identified BMS device.

TOC data 91 is shown to further include a location 102 (e.g., offset) of each identified provisioning data portion within update file 70. Main control unit 30 may use location 102 to readily select specific partitions to extract from portable data storage device 60. TOC data 91 is shown to further include a CRC code 103 for each identified provisioning data portion and a file size 104 of each identified portion compressed provisioning data. In some embodiments, CRC code 103 may be the same as CRC code 97. In other embodiments, CRC code 103 may be a CRC code for the compressed provisioning data whereas CRC code 97 is a CRC code for the uncompressed provisioning data. Similarly, file size 104 may be either an uncompressed file size or a compressed file size.

In some embodiments, TOC data 91 is compressed data. TOC data 91 may be compressed using a lossless compression utility (e.g., a "Zlib" library, a "sec_zlib" library, etc.) implementing any well known lossless compression algorithms (e.g., the "gzip" lossless compression algorithm, etc.). The compression utility may append an original file size 98 (e.g., a file size of the uncompressed data) and/or CRC code 99 to TOC data 91. In some embodiments, main control unit 30 may receive TOC data 91 in the compressed format. Main control unit 30 may decompress and/or extract TOC data 91 upon receiving such data from portable data storage device 60. In some embodiments, main control unit 30 may validate the extracted TOC data to ensure that no extraction or decompression errors have occurred. The validation process may include comparing original file size 98 and/or original CRC code 99 with the a file size and/or CRC code size of the extracted TOC data. The CRC code of the extracted TOC data may be generated by main control unit 30 upon extracting such data Referring now to FIG. 6, a detailed block diagram of main control unit 30 is shown, according to an exemplary embodiment. Main control unit 30 is shown to include a data communications interface 110, a user interface 115, and a processing circuit 120. Data communications interface 110 can be or include wired or wireless interfaces (e.g., jacks, antennas, transmitters, receivers, transceivers, wire terminals, etc.) for conducting data communications with, for example, portable data storage device 60, measurement devices 31, control devices 41, communications network 50, auxiliary control units 32-36, or other external devices or data sources. In some embodiments, data communications interface 110 includes a BACnet SA bus for conducting data communications using the BACnet protocol. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 110 can include an Ethernet card and port for sending and receiving data via an Ethernet-based communications link or network. In another example, communications interface 110 can include a WiFi transceiver or a cellular or mobile phone transceiver for communicating via a wireless communications network.

User interface 115 may be an onboard (e.g., local) user interface for main control unit 30. User interface 115 may include a user input device (e.g., a pushbutton, a keyboard, a dial, a mouse, a microphone, a touch-sensitive display, etc.) capable of converting a user input (e.g., a selection) into an electronic signal or command for main control unit 30. User interface 115 may further include an output device (e.g., an electronic display, a monitor, a speaker, etc.) capable of converting an electronic signal into one or more forms of sensory data for presentation to a user.

In some embodiments, user interface 115 may be used to initiate and control the provisioning process. For example, user interface 115 may display a menu of available provisioning options. Available provisioning options may include, for example, a "view current system version" menu option, an "update firmware" menu option, a "backup configuration" menu option, a "restore configuration" menu option, a "create factory defaults" menu option, a "restore factory defaults" menu option, a "change parameters" menu option, an "import key parameters" menu option, and an "import schedule" menu option. A user may select one of the available menu options to initiate a provisioning process corresponding to the selected option. The various provisioning processes are described in greater detail with reference to user interface module 135.

Figure 6:
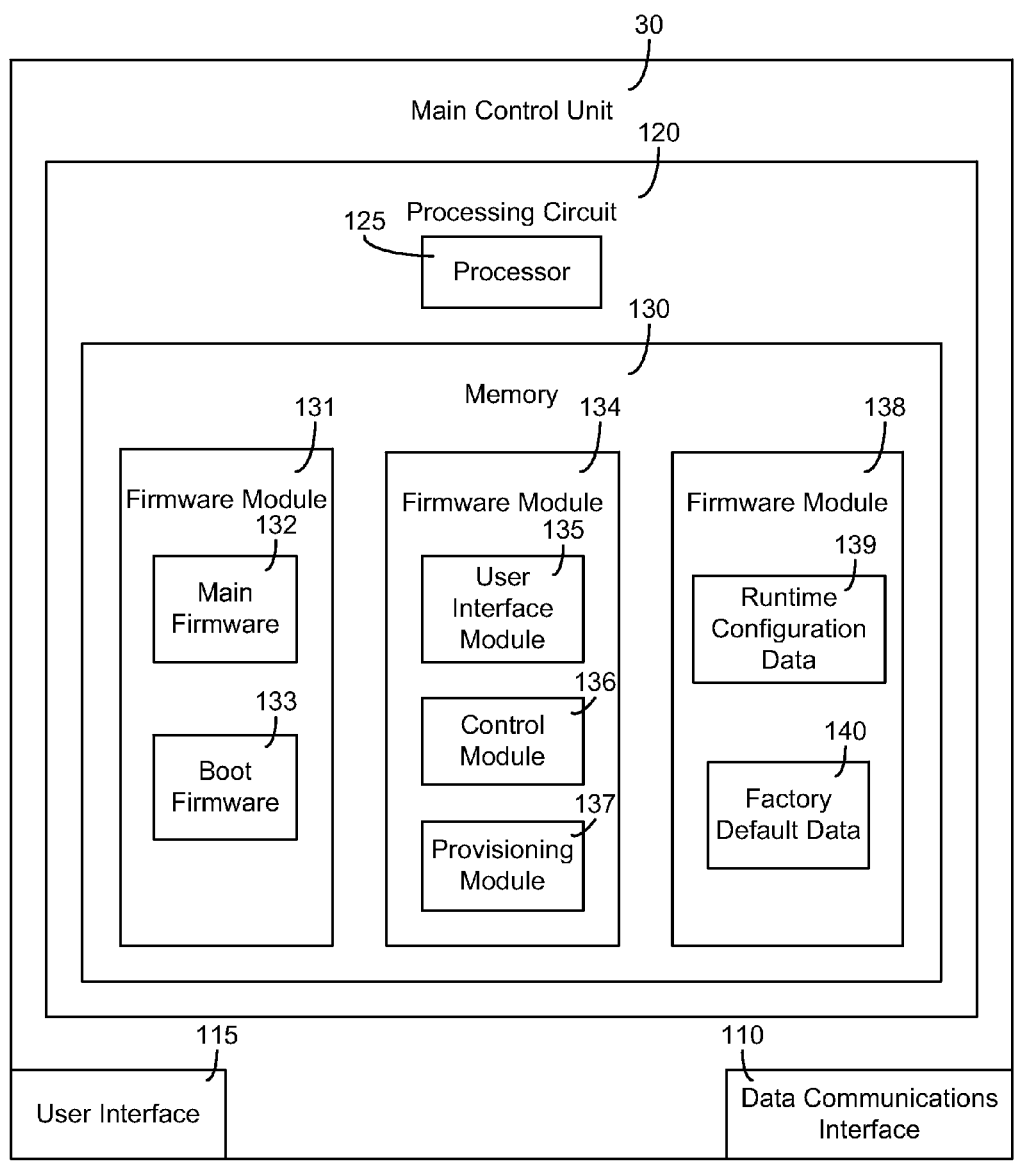
FIG. 6 is block diagram of the main control unit shown in FIG. 2, shown to include a processing circuit having several memory modules including a provisioning module, according to an exemplary embodiment.

Still referring to FIG. 6, processing circuit 120 is shown to include a processor 122 and memory 130. Processor 122 can be implemented as a general purpose processor, an application specific integrated circuit (ASIC), one or more field programmable gate arrays (FPGAs), a group of processing components, or other suitable electronic processing components. Memory 130 (e.g., memory device, memory unit, storage device, etc.) is one or more devices (e.g., RAM, ROM, solid state memory, hard disk storage, etc.) for storing data and/or computer code for completing or facilitating the various processes, layers and modules described in the present application.

Memory 130 may be or include volatile memory or non-volatile memory. Memory 130 may include database components, object code components, script components, or any other type of information structure for supporting the various activities and information structures described in the present application. According to an exemplary embodiment, memory 130 is communicably connected to processor 122 via processing circuit 120 and includes computer code for executing (e.g., by processing circuit 120 and/or processor 122) one or more processes described herein. Memory 130 is shown to include a firmware module 131, an application module 134, and a configuration module 138.

Still referring to FIG. 6, firmware module 131 is shown to include a main firmware module 132 and a boot firmware module 133. Main firmware module 132 may include firmware data for the firmware currently running on main control unit 30. Main firmware module 132 may include binary data which is executed by processor 125 (e.g., after a boot process) to support the fundamental data processing and control operations performed by main control unit 30. In some embodiments, main firmware module 132 may include a version attribute identifying the version of the main firmware data currently present on main control unit 30.

Boot firmware module 133 may include firmware data for the boot firmware currently running on main control unit 30. Boot firmware module 133 may include binary data which is executed by processor 125 upon startup (e.g., before executing main firmware module 132). Boot firmware module 133 may be configured to update main firmware module 132 during the "update firmware" provisioning process. For example, main control unit 30 may be rebooted during the "update firmware" provisioning process so that main firmware module 132 may be replaced with updated firmware before the data in main firmware module 132 becomes locked for execution by processor 125. In some embodiments, boot firmware module 133 may include a version attribute identifying the version of the boot firmware data currently present on main control unit 30.

Still referring to FIG. 6, configuration module 138 is shown to include runtime configuration data 139 and factory default data 140. Runtime configuration data 139 may include configuration parameters for main control unit 130. Configuration parameters may include tuning parameters (e.g., proportional gain, integral time, sampling rate, etc.), system model definitions (e.g., variable system parameters for a model predictive control system, Kalman gain parameters, estimated time constant, etc.), other types of configuration data, schedules, and/or static or dynamic field data. Runtime configuration data 139 may be used to customize main control unit 30 to a particular system or control process. Factory default data 140 may include default configuration data set by an equipment manufacturer during the control unit manufacturing and testing process.

Still referring to FIG. 6, memory 130 is shown to include an application module 134. Application module 134 may include application archive data (e.g., process code, control logic, etc.) for running various processing and control applications. Application module 134 is shown to include a control module 136, a user interface module 135, and a provisioning module 137. Control module 136 may include the control logic used by main control unit 30 in translating input signals from measurement devices 31 into control signals for control devices 41. Control module 136 may include proportional control logic, integral control logic, derivative control logic, pattern recognition adaptive control (PRAC) logic, model predictive control (MPC) logic, and/or control logic for any other type of control system. Control module 136 may be used for conducting substantive building control functions (e.g., as part of a building management system). For example, control module 136 may include control functionality for a HVAC system, a lighting system, a water system, an elevator system, a security system, or any other type of building control system.

User interface module 135 is configured to generate one or more user interfaces for receiving input from a user. User interface module 135 may be configured to provide, for example, a graphical user interface, a voice driven interface, a text-based interface, or another interface for receiving user input. User interface module 135 may receive input commands from user interface 115 and generate a user interface for display on user interface 115 to guide a user through the provisioning process. User interface module 135 may function as an intermediary between user interface 115 and provisioning module 137.

In some embodiments, user interface module 135 may cause a list of selectable provisioning options to be displayed on user interface 115 in response to a user inserting portable data storage device 60 into main control unit 30 (e.g., into a USB port, a memory card slot, etc.). Available provisioning options may include, for example, a "view current system version" menu option, an "update firmware" menu option, a "backup configuration" menu option, a "restore configuration" menu option, a "create factory defaults" menu option, a "restore factory defaults" menu option, a "change parameters" menu option, an "import key parameters" menu option, and an "import schedule" menu option.

In response to a user selection of the "view current system version" menu option, user interface module 135 may relay a system version command (e.g., "Read Attr SYSTEM_VERSION( )") to provisioning module 137. Provisioning module 137 may query the system for version information and respond by providing user interface module 135 with a single firmware version representing all of the loadable firmware components currently in use by main control unit 30 and by auxiliary control units 32-36 (e.g., a current "system version" for BMS 20). In other embodiments, the firmware versions of each control unit may be provided individually. User interface module 135 may then cause the current firmware version(s) to be presented to a user via user interface 115. In some embodiments, a user may determine whether to update the firmware on one or more BMS devices based on the presented firmware versions. In other embodiments, provisioning module 137 may automatically determine whether to update the firmware on one or more BMS devices without requiring further user interaction.

In response to a user selection of the "update firmware" menu option, user interface module 135 may relay a command for available firmware updates (e.g., "Read Attr USB_PACKAGE_LIST( )") to provisioning module 137. Provisioning module 137 may scan portable data storage device 60 for updates and provide user interface module 135 with a list of firmware update options (e.g., available firmware versions) included in update file 70. User interface module 135 may then cause the list of firmware update options to be presented to a user via user interface 115. A user may select one of the firmware update options to proceed with the firmware update process. In response to a user selection of one of the firmware update options, user interface module 135 may prompt the user for confirmation via user interface 115. During the firmware update process, user interface module 135 may cause a status message to be displayed on user interface 115 to provide feedback regarding the status of the firmware update operations on the main control unit and/or the connected auxiliary control units. Upon completion of the firmware update process, user interface module 135 may cause user interface 115 to display an "update complete" message and to display the new firmware system version running on BMS 20.

In response to a user selection of the "backup configuration" menu option, user interface module 135 may submit a backup configuration command to provisioning module 137. Provisioning module 137 may respond by reading all of the writable configuration parameters (e.g., from runtime configuration data 139 and/or from configuration modules 153, 156,159 of auxiliary control units 32-36) and writing the configuration data to portable data storage device 60 (e.g., to a backup files list). In some embodiments, the configuration data may be saved in a user friendly format (e.g., a .txt file, a .csv file, etc.) to facilitate subsequent inspection and/or processing. During the configuration backup process, user interface module 135 may cause a status message to be displayed on user interface 115 to provide feedback regarding the status of the configuration backup process.

In response to a user selection of the "restore configuration" menu option, user interface module 135 may relay a backup files command (e.g., "Read Attr BACKUP_FILES_LIST") to provisioning module 137. Provisioning module 137 may scan portable data storage device 60 respond by providing user interface module 135 with a list of backup files available on portable data storage device 60. The backup files may have been created by previously selecting the "backup configuration" menu option or otherwise created (e.g., by a manufacturer, by a separate backup process, etc.). In some embodiments, user interface module 135 may determine whether any of the potential backup configuration files were previously created from BMS 20. User interface module 135 may automatically select a valid backup file (e.g., a backup file suitable for use with BMS 20) or prompt a user to select a backup file for restoration. In response to a selection or confirmation of a backup file, user interface module 135 may instruct provisioning module 137 to copy the selected backup file to runtime configuration data module 139 and/or configuration modules 153,156,159 (e.g., of auxiliary control units 32-36). During the restoration process, user interface module 135 may cause a status message to be displayed on user interface 115 to provide feedback regarding the status of the restoration process.

In response to a user selection of the "create factory defaults" menu option, user interface module 135 may submit a factory defaults creation command to provisioning module 137. Provisioning module 137 may respond by copying the data from runtime configuration data 139 to factory default data 140. In some embodiments, provisioning module 137 may create factory defaults on each of auxiliary control units 32-36 as well in response to a selection of the "create factory defaults" menu option. Factory defaults on auxiliary control units 32-36 may be created by copying data from a runtime configuration module on each of auxiliary control units 32-36 to a factory default data memory module on each of auxiliary control units 32-36. The "create factory defaults" menu option provides similar functionality to the "backup configuration" menu option, with the exception that the configuration data is written to factory default data 140 and/or a corresponding factory default data module of auxiliary control units 32-36 rather than to portable data storage device 60. During the copying process, user interface module 135 may cause a status message to be displayed on user interface 115 to provide feedback regarding the status of the process.

In response to a user selection of the "restore factory defaults" menu option, user interface module 135 may submit a factory defaults restoration command to provisioning module 137. Provisioning module 137 may respond by copying the data from factory default data 140 to runtime configuration data 139. The "restore factory defaults" menu option provides similar functionality to the "restore configuration" menu option, with the exception that the configuration data is copied from factory default data 140 and/or a corresponding factory default data module of auxiliary control units 32-36 rather than from portable data storage device 60. During the restoration process, user interface module 135 may cause a status message to be displayed on user interface 115 to provide feedback regarding the status of the process.

In response to a user selection of the "import parameters" menu option, user interface module 135 may relay a command for available backup files (e.g., "Read Attr BACKUP_FILES_LIST") to provisioning module 137. Provisioning module 137 may scan portable data storage device 60 and provide user interface module 135 with a list of backup files available on portable data storage device 60. In response to a selection or confirmation of a backup file, user interface module 135 may instruct provisioning module 137 to copy the selected backup file to runtime configuration data module 139 and/or configuration modules 153,156,159. The "import parameters" menu option provides similar functionality to the "restore configuration" menu option, with the exception that the configuration data was not created from a previous backup of the same system. Advantageously, the "import parameters" menu option may be used to clone a particular configuration from one BMS to another. During the importation process, user interface module 135 may cause a status message to be displayed on user interface 115 to provide feedback regarding the status of the process.

In response to a selection of the "change parameters" menu option, user interface module 135 may relay a command for all writable configuration parameters (e.g., runtime configuration data 139) to provisioning module 137. Provisioning module 137 may query the system for such parameters and respond by providing user interface module 135 with a list of all changeable parameters and the current values corresponding to each parameter (e.g., in runtime configuration module 139 and/or configuration modules 153,156,159). A user may select an individual parameter via user interface 115 and enter a new value for the selected parameter. User interface module 135 may submit a "write attribute" command to provisioning module 137 including the name of the modified parameter and the new parameter value. Provisioning module 137 may overwrite the current parameter value in runtime configuration data 139 and/or configuration modules 153,156,159 with the user-selected parameter value. In response to a successful update, user interface module 135 may generate a message for presentation to a user via user interface 115 confirming that the new parameter value has been successfully set.

Figure 7:
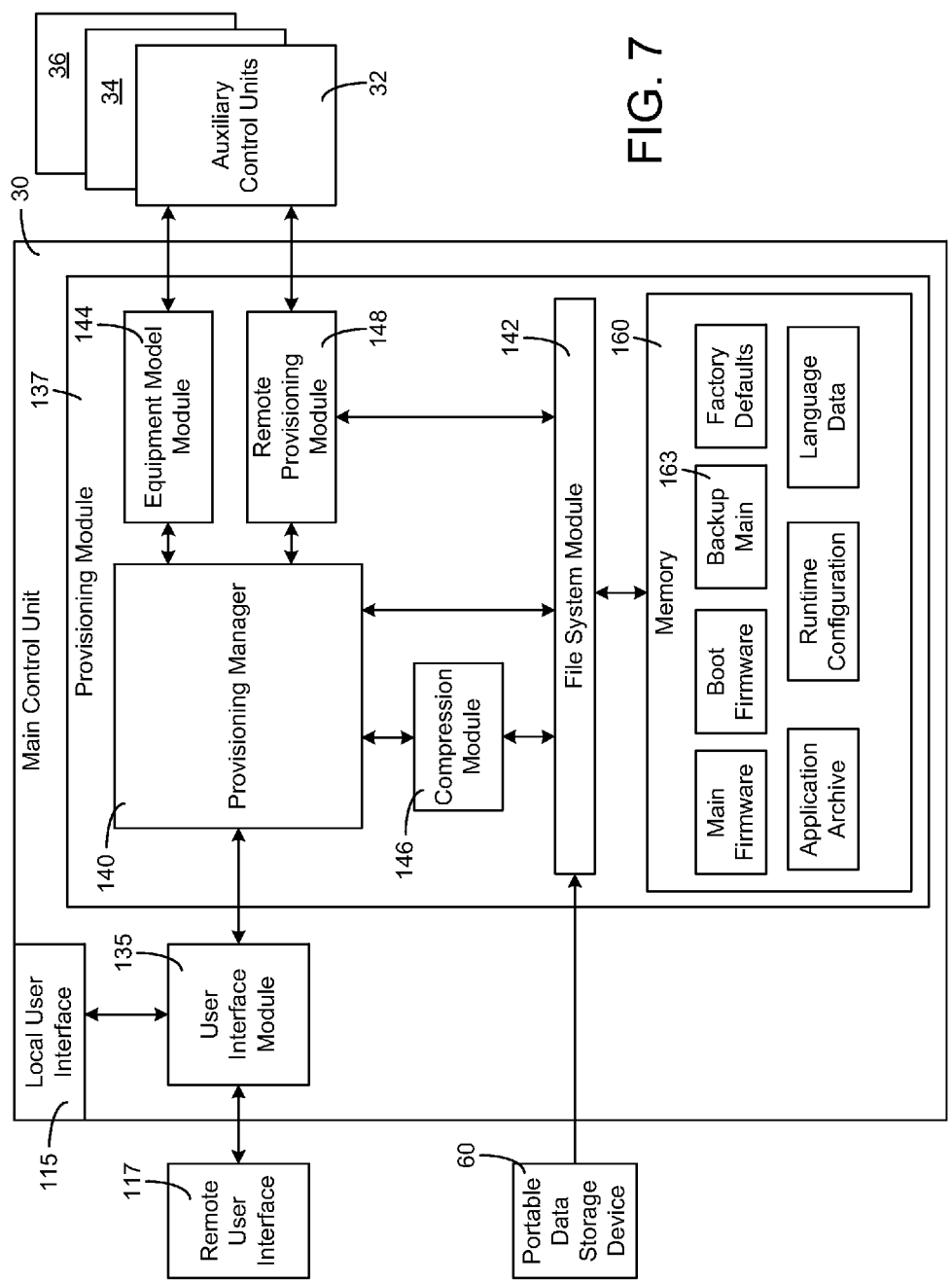
FIG. 7 is a detailed block diagram of the provisioning module shown in FIG. 6, according to an exemplary embodiment.

Referring now to FIG. 7, a detailed block diagram of provisioning module 137 is shown, according to an exemplary embodiment. Provisioning module 137 is shown to include several sub-modules including a provisioning manager 140, a file system module 142, an equipment model module 144, a compression module 146, and a remote provisioning module 148.

File system module 142 may control the file system of main control unit 30. File system module 142 may provide access to portable data storage device 60 and the provisioning data contained therein. File system module 142 may also provide access to programmable memory 160 within main control unit 30. Programmable memory 160 may include internal flash memory, serial flash memory, data flash (EEPROM) memory, or other types of programmable memory. File system module 142 may be responsible for executing the read/write operations used to copy provisioning data from portable data storage device 60 to an associated portion of memory 160. File system module 142 may receive commands from provisioning manager 140 specifying selected provisioning data to copy from portable data storage device 60. File system module 142 may interact with compression module 146 to decompress the coped provisioning data and with remote provisioning module 148 to communicate some or all of the decompressed provisioning data to auxiliary control units 32-36.

Still referring to FIG. 7, provisioning module 137 is shown to include an equipment model module 144. Equipment model module 144 may manage and control information relating to the current state of BMS 20. For example, equipment model module 144 may maintain a list of all available BMS devices across BMS 20 along with static configuration data associated with each device including main control unit 30 and auxiliary control units 32-36 (e.g., device names, device hardware versions, device attributes, etc.) Equipment model module 144 may make use of various BACnet data sharing services (e.g., "Who-Is," "I-Am," "Who-Has," "I-Have," etc.) for identifying and mapping BMS devices (e.g., control units 30-36, measurement devices 31-37, control devices 41-47, etc.).

In some embodiments, equipment model module 144 may manage and control dynamic configuration data associated with each BMS device. For example, equipment model module 144 may maintain a list of current firmware versions, current application archive versions, and/or current configuration parameter values associated with each device. Equipment model module 144 may make use of the "Read-Property" and "Write-Property" BACnet services to obtain such information from remote BMS devices. In some embodiments, equipment model module 144 may manage and control current state information for both local and remote BMS devices (e.g., main control unit 30, auxiliary control units 32-36, etc.).

Equipment model module 144 may receive queries from provisioning manager 140 requesting current state information. Equipment model module 144 may be interact with firmware module 131, application module 134, configuration module 138 to receive current configuration settings for main control unit 30. Equipment model module 144 may interact with auxiliary control units 32-36 (e.g. via communications network 50) to receive current state information from remote devices. Equipment model module 144 may provide the current state information to provisioning manager 140 in response to the request for such information. In some embodiments, provisioning manager 140 may directly interact with various components of main control unit 30 and auxiliary control units 32-36 to gather information such as current firmware versions, application archive versions, device connection status, etc. In other embodiments, equipment model module 144 may gather firmware and application information along with current configuration settings.

In some embodiments, equipment model module 144 may be responsible for updating dynamic configuration settings during the provisioning process. For example, equipment model module 144 may be a software-defined object having attributes corresponding to writable parameters such as tuning parameters (e.g., proportional gain, integral time, sampling rate, etc.), system model definitions (e.g., variable system parameters for a model predictive control system, Kalman gain parameters, estimated time constant, etc.), and other updatable parameter values. Updating an attribute of equipment model module 144 may automatically update the corresponding parameter value.

Still referring to FIG. 7, provisioning module 137 is shown to include a compression module 146. Compression module 146 may provide file compression and decompression functionality for provisioning module 137. In some embodiments, provisioning data may be received from portable data storage device 60 in a compressed format. Compression module 146 may decompress or extract the received provisioning data so that the data may be read and used by other components of BMS 20. Compression module 146 may include a lossless compression utility (e.g., a "Zlib" library, a "sec_zlib" library, etc.) implementing any well known lossless compression algorithms (e.g., the "gzip" lossless compression algorithm, etc.).

In some embodiments, compression module 146 may provide file integrity validation for provisioning module 137. In some embodiments, the provisioning data received from portable data storage device 60 may include a CRC code or other validity identifier (e.g., an original file size, a checksum, etc.). The validity identifier may correspond to an original attribute of the provisioning data before such data was compressed. Compression module 146 may generate a validity code based on the extracted/decompressed provisioning data and compare the generated validity code with the validity identifier received with the compressed provisioning data. If the validity code matches the validity identifier, compression module 146 may determine that the extracted provisioning data is valid. In some embodiments, compression module 146 may sign or mark (e.g., by appending a digital signature) provisioning data determined to be valid.

Still referring to FIG. 7, provisioning module 137 is shown to include a remote provisioning module 148. Remote provisioning module 148 may receive decompressed provisioning data from memory 160 (e.g., via file system module 142) and provide the decompressed provisioning data to remote BMS devices (e.g., auxiliary control units 32-36 or other devices within BMS 20). Advantageously, remote provisioning module 148 may make use of a pre-existing communications network within BMS 20 (e.g., a BACnet SA network) to communicate the provisioning data to remote BMS devices. This advantage eliminates the need for a more complicated provisioning process involving higher level communication networks. In some embodiments, remote provisioning module 148 may use currently operational provisioning protocols to ensure that auxiliary control units 32-36 properly receive and apply the transmitted provisioning data. In some embodiments, the decompressed provisioning data (e.g., a data image) may be communicated along with metadata such as an image name string (e.g., image name string 86). The image name string may specify a particular device name and/or device index to ensure that the data image is properly applied to the designated BMS device.

Still referring to FIG. 7, provisioning module 137 is shown to include a provisioning manager 140. Provisioning manager 140 may manage and coordinate the provisioning of all BMS devices across BMS 20 (e.g., main control unit 30, auxiliary control units 32-36, etc.). Provisioning manager 140 may process requests from user interface module 135 (e.g., user selections of an available menu option) received from either local user interface 115 or a remote user interface 117. Provisioning manager 140 may interact with file system module 142 to access data on portable data storage device 60 (e.g., TOC metadata 81, file partition metadata 82-85, etc.) and determine a list of available updates included in update file 70.

Provisioning manager 140 may interact with equipment model module 144 to receive BMS device information (e.g., device names, device hardware versions, etc.) and provisioning data versions (e.g., firmware versions, application versions, etc.) currently in use by each device of BMS 20. Provisioning manager 140 may determine whether any of the available provisioning data included in update file 70 qualify as updates for any connected BMS device by comparing the list of available updates with the versions currently in use by each BMS device. If update file 70 contains an update, provisioning manager 140 may identify particular partitions of update file 70 to download from portable data storage device 70. Provisioning manager 140 may interact with file system module 142 to download the identified partitions to a portion of memory 160 associated with each type of provisioning data (e.g., main firmware, boot firmware, application archive data, etc.).

Provisioning manager 140 may interact with compression module 146 to decompress the downloaded provisioning data and verify the integrity of the extracted data images. Once the provisioning data has been downloaded and extracted, provisioning manager 140 may interact with remote provisioning module to apply the data images to remote BMS devices (e.g., auxiliary control units 32-36). Provisioning manager 140 may also interact with file system module 140 or equipment model module 144 to copy the data images from each portion of memory 160 to one or more of firmware module 131, application module 134, and configuration module 137 corresponding to the associated portion of memory 160.

In some embodiments, the extracted provisioning data includes main firmware data for main control unit 30. Provisioning manager 140 may be unable to directly copy such data to main firmware module 132 while main firmware module 132 is currently locked for execution (e.g., by processor 125). To update main firmware module 132, provisioning manager 140 may cause the extracted main firmware image to be copied to a "backup main" memory module 163 of memory 160. Provisioning manager 140 may then configure boot firmware module 133 to copy the updated firmware from backup main module 163 to main firmware module 132 during the next boot sequence.

Figure 8A:
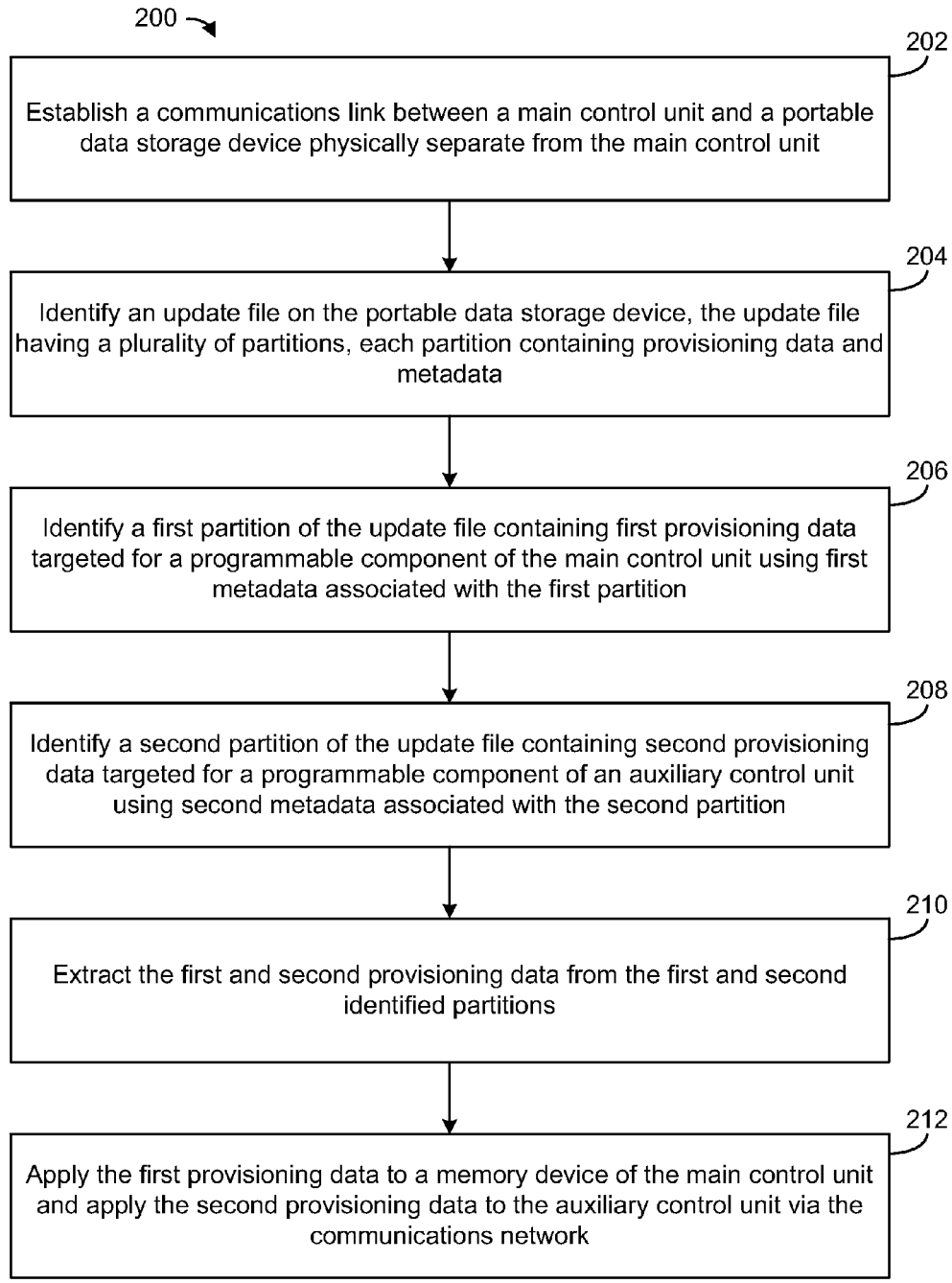
FIG. 8A is a flowchart of a process for updating building equipment by identifying and extracting provisioning data included in an update file on a portable data storage device, according to an exemplary embodiment.
Figure 8B:
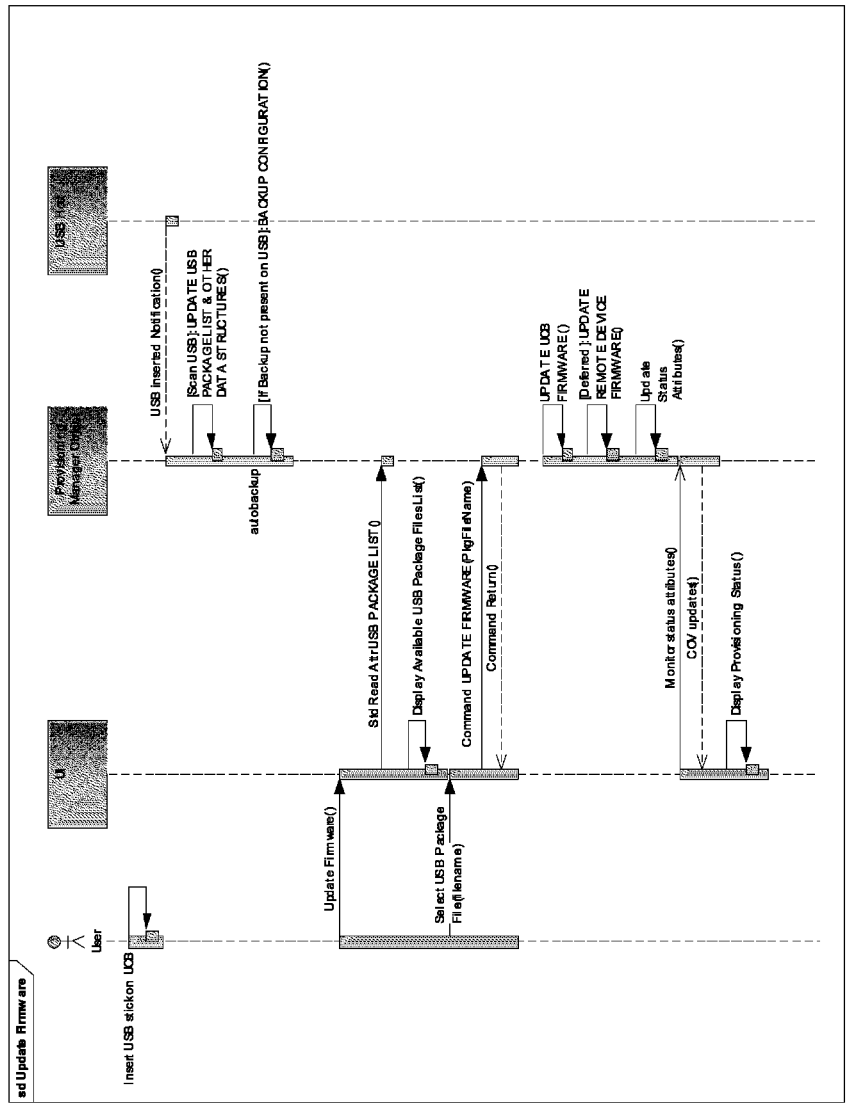
FIGS. 8B-8C are sequence diagrams illustrating the process described in FIG. 8A, according to an exemplary embodiment.
Figure 8C:
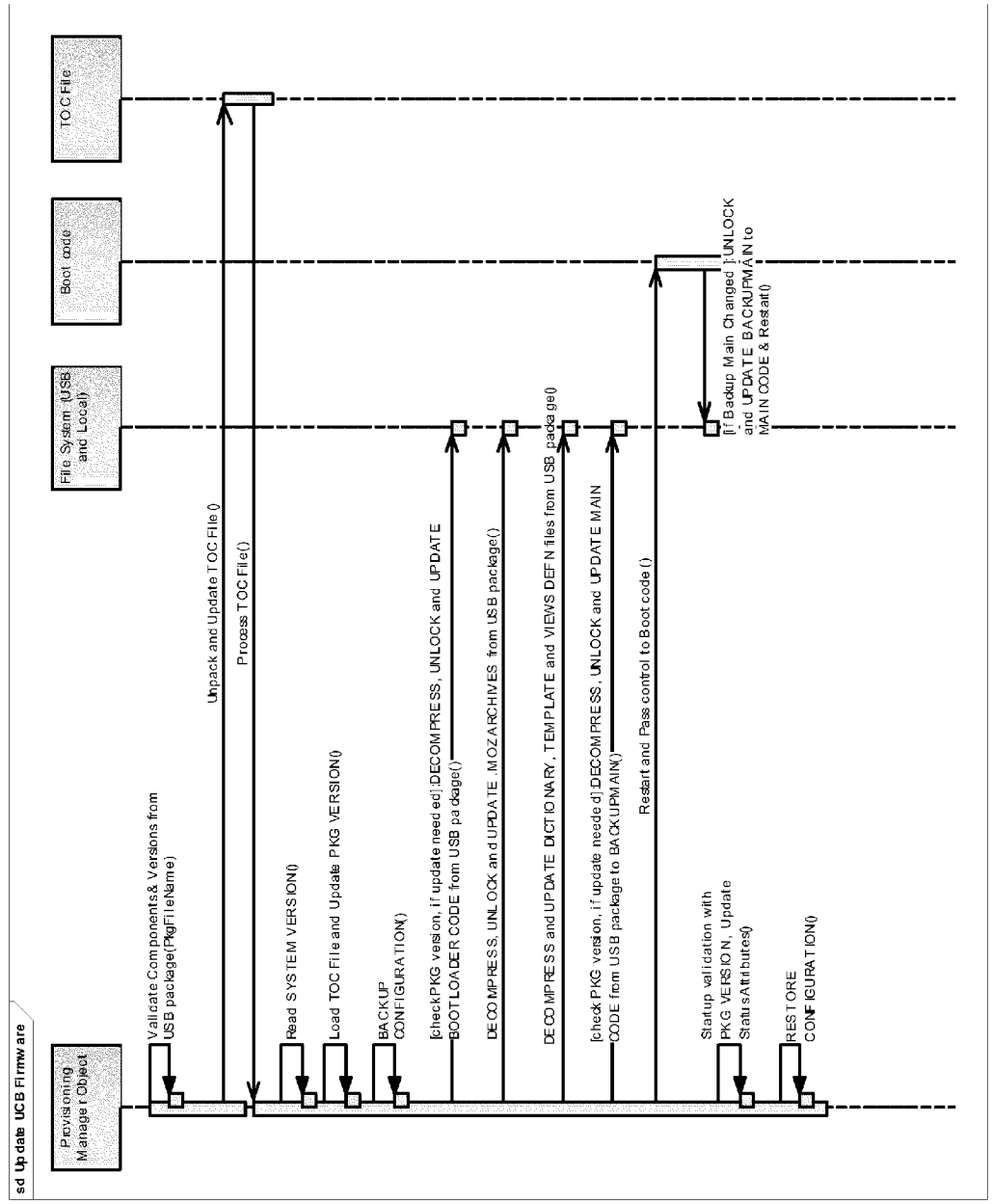

Referring now to FIGS. 8A-8C, a flowchart of a process 200 for updating equipment in a building management system (FIG. 8A) and corresponding sequence diagrams (FIGS. 8B-8C) are shown, according to an exemplary embodiment. Process 200 may be performed by main control unit 30 using various components thereof (e.g., provisioning module 137, data communications interface 110, etc.). In some implementations, process 200 may be performed in response to a user selection of an update option received via a user interface element of main controller 30. In some embodiments, the user interface element may be a local hardware interface (e.g., user interface 115). In other embodiments, the user interface element may be a user interface module or application (e.g., user interface module 135). The user interface module may receive input signals from a local hardware user interface.

Process 200 is shown to include establishing a communications link between a main control unit and a portable data storage device physically separate from the main control unit (step 202). In some embodiments, the portable data storage device may communicate with the main control unit via a USB connection or other hardwired connection. For example, a user may insert the portable data storage device into a USB port, memory card slot, or other hardwired communications interface of the main control unit.

In some embodiments, the portable data storage device may be physically separate from the main control unit. In other words, the portable data storage device and the main control unit are physically separable components. However, the portable data storage device may be physically proximate to the main control unit when step 202 is performed. For example, the portable data storage device may be inserted into a USB port or memory card slot of the main control unit. Such physical proximity does not disqualify a portable data storage device as a "physically separate" component.

In some embodiments, upon establishing a communications link with the portable data storage device, the main control unit may scan the portable data storage device for a backup file. If a backup file is not present on the portable data storage device, the main control unit may create a backup file (e.g., as described with reference to FIGS. 9A-9B) and copy the backup file to the portable date storage device. The backup file may include provisioning data (e.g., configuration settings, application data, etc.) extracted from one or more BMS devices.

In some embodiments, the main control unit may present a plurality of selectable menu options via the user interface element in response to establishing a communications link with the portable data storage device. Such options may include an "update firmware" menu option. A user may select the "update firmware" menu option (e.g., via local hardware interface 115) to proceed with the provisioning process.

Still referring to FIGS. 8A-8C, process 200 is shown to further include identifying an update file on the portable data storage device, the update file having a plurality of partitions, each partition containing provisioning data and metadata (step 204). In response to a user selection of the "update firmware" menu option, the main control unit may scan the portable data storage device for available update files (e.g., package files, update packages, etc.) containing provisioning data and metadata. After scanning the portable data storage device, a list of available update files may then be presented via the user interface element. In some embodiments, a user may select an update file from the presented list to proceed with the provisioning process. In other embodiments, an update file may be automatically selected by the main control unit. After an update file is selected (e.g., by a user or automatically), the user interface element may send an "update firmware" command to a provisioning manager object of the main control unit. The "update firmware" command may instruct the provisioning manager object to proceed with the provisioning process using the provisioning data contained in the selected update file.

Provisioning data may include firmware data, application data, configuration data, or any combination thereof. Provisioning data may include any static or dynamic data used by the main controller or the auxiliary controller(s) in conducting various processing or control operations. In some embodiments, each of the plurality of partitions contains a single type of provisioning data (e.g., firmware data, application data, or configuration data). In some embodiments, each of the plurality of partitions contains provisioning data for a single BMS device (e.g., the main control unit, the auxiliary control unit, another BMS device, etc.). In some embodiments, the provisioning data may be compressed prior to packaging the provisioning data into the plurality of partitions. The provisioning data may include an original file size appendix and/or an original CRC code appendix corresponding to attributes of the uncompressed provisioning data.

The metadata contained in each partition may describe the provisioning data contained in the same partition. The metadata in each partition may be a file header, a footer, or descriptive data located elsewhere within each partition. In some embodiments, the metadata in each partition includes a device identifier indicating a device to which the provisioning data contained in the same partition applies. In some embodiments, the metadata in each partition includes a version identifier indicating a version of the provisioning data in the same partition. In some embodiments, the metadata in each partition includes a type identifier indicating a type of provisioning data (e.g., main firmware data, boot firmware data, application data, configuration data, etc.) contained in the same partition.

Still referring to FIGS. 8A-8C, process 200 is shown to further include identifying a first partition of the update file containing first provisioning data targeted for the main control unit using first metadata associated with the first partition (step 206) and identifying a second partition of the update file containing second provisioning data targeted for an auxiliary control unit using second metadata associated with the second partition (step 208). The auxiliary control unit may be connected with the main control unit via a communications network. The communications network may be the same or similar to communications network 50 described in reference to FIG. 2. The communications network may be a BACnet sensor-actuator communications network or other network by which the main control unit may communicate with the auxiliary control unit. In some embodiments, the communications network may be a local network used only by the building management system containing the main control unit and the auxiliary control unit. Although only two devices are described in reference to FIGS. 8A-8C, process 200 may identify any number of partitions corresponding to any number of BMS devices in various alternate embodiments.

In some embodiments, the first and second partitions may be identified by a provisioning manager (e.g., provisioning manager 140) using metadata associated with each partition. The provisioning manager may receive system information such as currently active devices, current firmware versions, current hardware versions, and/or other static or dynamic configuration data from the auxiliary control unit. In some embodiments, the provisioning manager may receive system information from a plurality of remote BMS devices. The system information may represent a current "system version" of the BMS.

In some embodiments, the provisioning manager may identify the first partition and the second partition by comparing the current "system version" with the version identifiers included in the update file metadata (e.g., TOC metadata, provisioning partition metadata, etc.). In some embodiments, the provisioning manager may identify the first partition and the second partition by comparing device identifiers included in the metadata of each partition with identity attributes of the main control unit and the auxiliary control unit. The provisioning manager may receive identity attribute information and/or version information from an equipment model module (e.g., equipment model module 144) of the main control unit.

Still referring to FIGS. 8A-8C, process 200 is shown to further include extracting the first and second provisioning data from the first and second identified partitions (step 210). In some embodiments, the provisioning data may be received from the portable data storage device in a compressed format. Step 210 may include decompressing the received provisioning data so that the data may be read and used by other components of the building management system. The main control unit may include a lossless compression utility (e.g., a "Zlib" library, a "sec_zlib" library, etc.) implementing any well known lossless compression algorithms (e.g., the "gzip" lossless compression algorithm, etc.) to decompress the provisioning data. In other embodiments, the provisioning data may be uncompressed. In some embodiments, extracting the provisioning data may involve copying the provisioning data from the portable data storage device to a memory device (e.g., memory 160) of the main control unit.

In some embodiments, step 210 may include verifying an integrity of the provisioning data. In some embodiments, the provisioning data received from the portable data storage device may include a CRC code or other validity identifier (e.g., an original file size, a checksum, etc.). The validity identifier may correspond to an original attribute of the provisioning data before such data was compressed. The main control unit may generate a validity code based on the extracted/decompressed provisioning data and compare the generated validity code with the validity identifier received with the compressed provisioning data. If the validity code matches the validity identifier, the main control unit may determine that the extracted provisioning data is valid. In some embodiments, the validation process may include signing or marking (e.g., by appending a digital signature) provisioning data determined to be valid.

Still referring to FIGS. 8A-8C, process 200 is shown to further include applying or updating the first provisioning data to a memory device of the main control unit and applying the second provisioning data to the auxiliary control unit via the communications network (step 212). Applying or updating the first provisioning data to a memory device of the main control unit may include copying the provisioning data from memory module 160 to an appropriate data module based on the type of provisioning data. For example, runtime configuration data may be copied to runtime configuration data module 139, factory default data may be copied to factory default data module 140, application archive data may be copied to application data module 134. Applying the first provisioning data to the memory device of the main control unit may include identifying a destination memory module (e.g., based on the metadata associated with the first provisioning data), mapping to and unlocking the destination data modules, and copying the first provisioning data to such modules.

In some embodiments, the extracted provisioning data includes main firmware data for the main control unit. The main control unit may be unable to directly copy such data to main firmware module 132 while main firmware module 132 is currently locked for execution (e.g., by processor 125). To update main firmware module 132, the main firmware provisioning data may be copied to backup main memory module 163. Updating main firmware module 132 may include restarting the main control unit and passing control over the provisioning process to boot firmware module 133. Boot firmware module 133 may be configured to determine whether the data in main memory module 163 has changed since the last boot sequence. If a change is detected, boot firmware module 133 may copy the updated main firmware data from main memory module 163 to main firmware module 132.

Applying the second provisioning data to the auxiliary control unit via the communications network may include establishing a download communication session with the auxiliary control unit from the main control unit and downloading or transmitting the decompressed provisioning data from memory 160 to the auxiliary control unit. Advantageously, the second provisioning data may be applied to the auxiliary control unit via an existing communications network within the building management system (e.g., a BACnet SA network). This advantage eliminates the need for a more complicated provisioning process involving higher level communication networks.

In some embodiments, the second provisioning data may be applied to the auxiliary control unit using currently operational provisioning protocols to ensure that the auxiliary control unit properly receives and applies the transmitted provisioning data. In some embodiments, the second provisioning data may be communicated along with the second metadata. The second metadata may include an image name string (e.g., image name string 86). The image name string may specify a particular device name and/or device index to ensure that the second provisioning data is properly applied to the auxiliary control unit. In some embodiments, a status of the updating process may be presented via the user interface element throughout process 200.

Figure 9A:
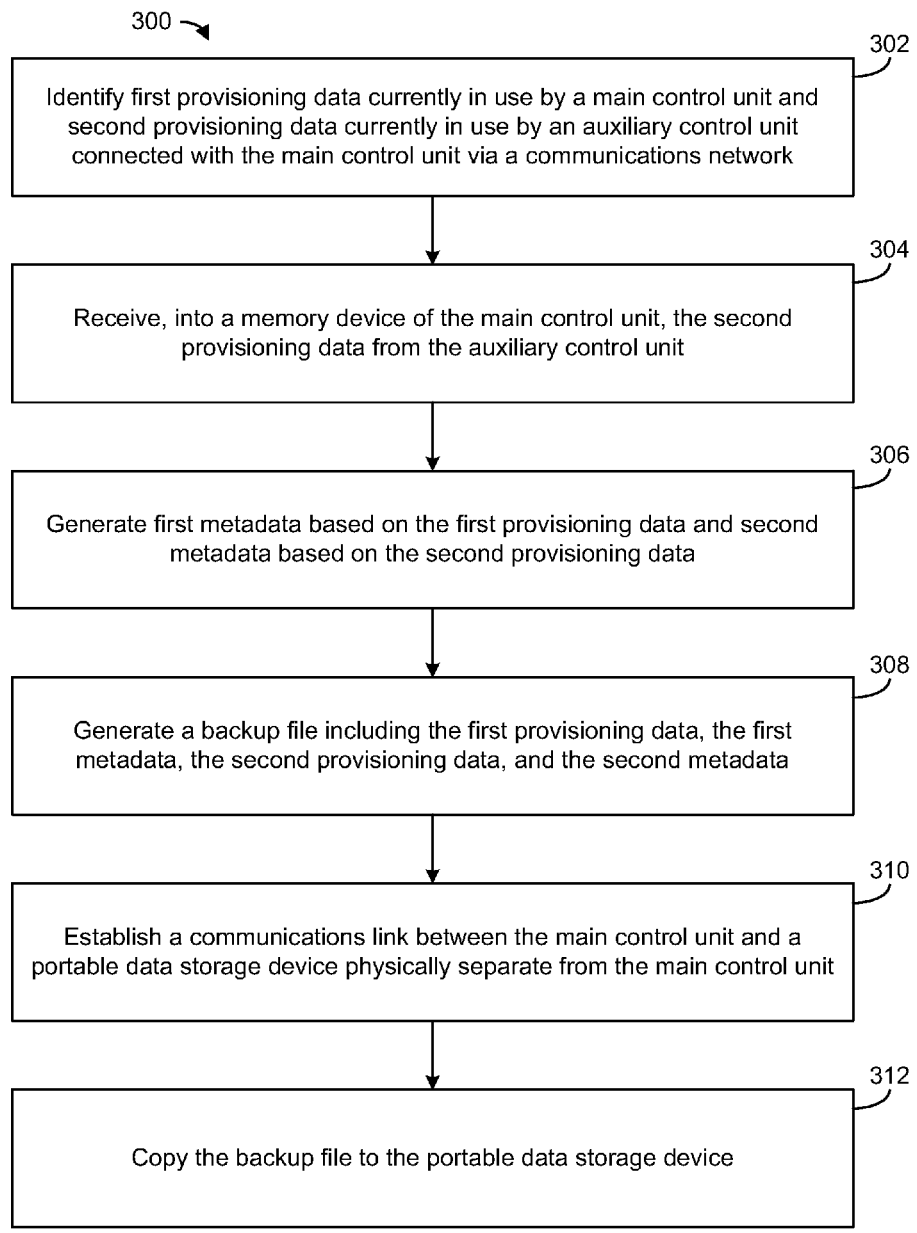
FIG. 9A is a flowchart of a process for backing up building equipment by identifying provisioning data stored on the building equipment, assembling the provisioning data into a backup file, and storing the backup file on a portable data storage device, according to an exemplary embodiment.
Figure 9B:
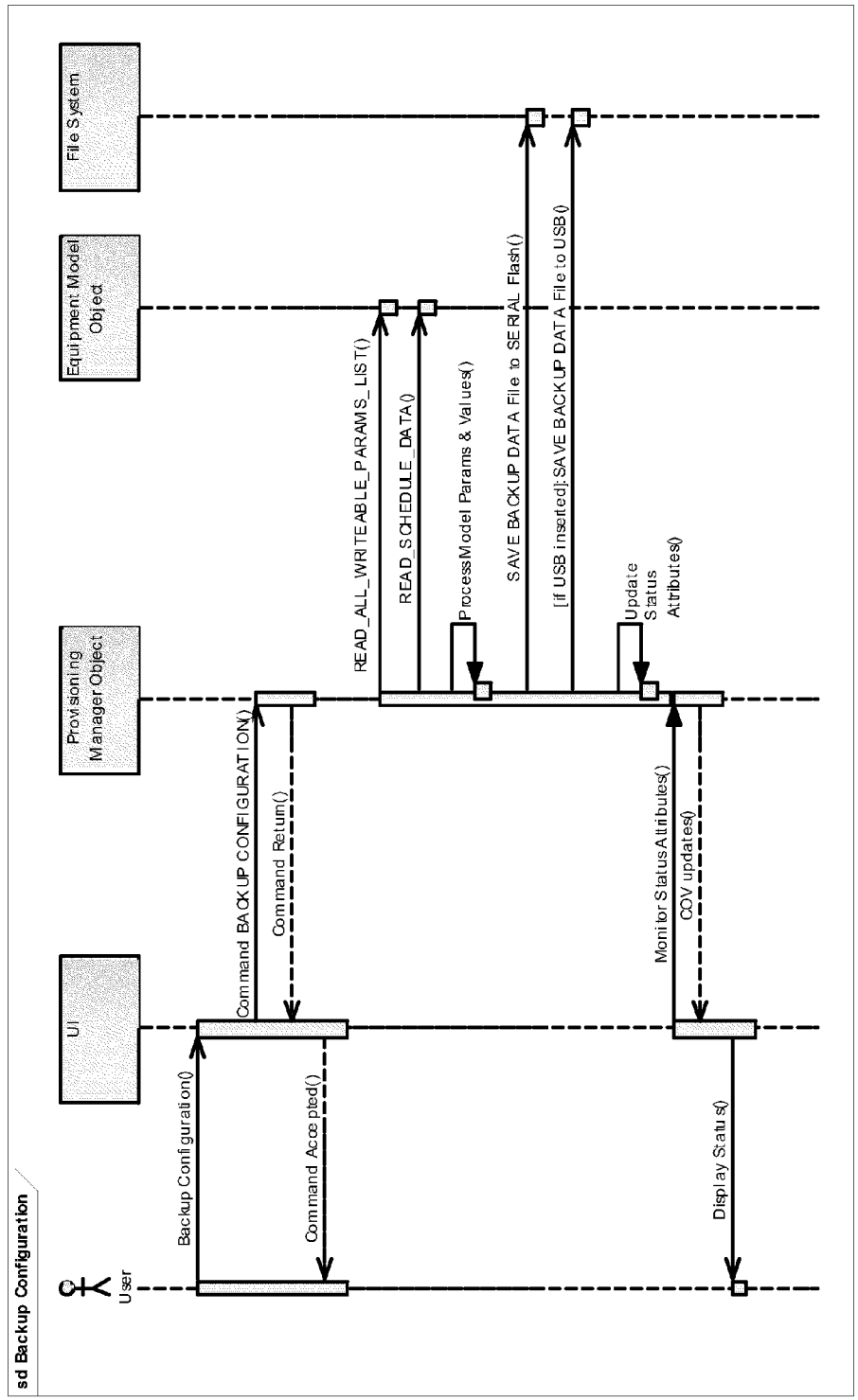
FIG. 9B is a sequence diagram illustrating the process described in FIG. 9A, according to an exemplary embodiment.

Referring now to FIG. 9A-9B, a flowchart of a process 300 for provisioning building management system (FIG. 9A) and a corresponding sequence diagram (FIG. 9B) are shown, according to an exemplary embodiment. Process 300 may be performed by main control unit 30 using various components thereof (e.g., provisioning module 137, data communications interface 110, etc.). In some implementations, process 200 may be performed in response to a user selection of a "backup configuration" menu option received via a user interface element of main controller 30. In some embodiments, the user interface element may be a local hardware interface (e.g., user interface 115). In other embodiments, the user interface element may be a user interface module or application (e.g., user interface module 135). The user interface module may receive input signals from a local hardware user interface (e.g., user interface 115). The user interface element may relay the "backup configuration" command to a provisioning manager object of the main control unit.

Process 300 is shown to include identifying first provisioning data currently in use by a main control unit and second provisioning data currently in use by an auxiliary control unit connected with the main control unit via a communications network (step 302). The communications network may be the same or similar to communications network 50 described in reference to FIG. 2. In some embodiments, the first and second provisioning data are identified by a provisioning manager of the main control unit. The provisioning manager may identify currently active provisioning data by requesting a list of all writable configuration parameters, from an equipment model object of the main control unit. The equipment model object may interact with remote BMS devices to obtain configuration settings, identity information, or other information from such devices. In some embodiments, the provisioning manager may also obtain firmware data, application archive data, version information, or other provisioning data from the auxiliary control unit.

Process 300 is shown to further include receiving, into a memory device of the main control unit, the second provisioning data from the auxiliary control unit (step 304). Step 304 may include receiving the second provisioning data from the auxiliary control unit via the communications network. The communications network may be a BACnet sensor-actuator communications network or other network by which the main control unit may communicate with the auxiliary control unit. In some embodiments, the communications network may be a local network used only by the building management system containing the main control unit and the auxiliary control unit. Advantageously, the second provisioning data may be received from the auxiliary control unit via an existing communications network within the building management system (e.g., a BACnet SA network). This advantage eliminates the need for a more complicated provisioning process involving higher level communication networks. Step 304 may be performed by copying the identified provisioning data (e.g., firmware data, application data, configuration data, etc.) data from each BMS device to a memory module of the main control unit.

Still referring to FIG. 9A-9B, process 300 is shown to further include generating first metadata based on the first provisioning data and second metadata based on the second provisioning data (step 306). In some embodiments, the metadata may include an image name string. The image name string may provide specific context for the provisioning data on which the metadata is based. For example, the image name string may include a device model name string, a device index sting, a device version number, an image file name, and an image file type. Each component of the image name string may be separated by a delimiter (e.g., a period, a comma, a colon, a slash, etc.).

The device model name may indicate a model name of the BMS device from which the provisioning data is received (e.g., the main control unit or the auxiliary control unit). The index may represent a hardware address of the source BMS device from which the provisioning data was obtained. The device version number may represent a hardware version of the source BMS device. The image file name may indicate a name of the provisioning data on which the metadata is based (e.g., main firmware, boot firmware, configuration settings, etc.). The image file type may represent a type of data structure of the corresponding provisioning data (e.g., binary data, parameter data, etc.). An example of a potential image name string 86 is shown in FIG. 4. In some embodiments, the metadata may include additional information regarding the provisioning data upon which the metadata is based. Such additional information may include a name of the original source file, a time stamp of the original source file, a date stamp of the original source file, and/or a CRC code. In some embodiments, the first and second metadata may be combined into a single metadata portion. In some embodiments, only one metadata may be generated based on the combined first and second provisioning data.

Still referring to FIG. 9A-9B, process 300 is shown to further include generating a backup file including the first provisioning data, the first metadata, the second provisioning data, and the second metadata (step 308). In some embodiments, the backup file may not be partitioned. In other embodiments, the backup file may include a first partition containing the first provisioning data and the first metadata and a second partition containing the second provisioning data and the second metadata. In some embodiments, the backup file may include any number of partitions in addition to the first and second partitions. For example, step 308 may include generating a backup file having three or more partitions, each partition containing provisioning data and metadata. In some embodiments, the provisioning data may be compressed prior to packaging the provisioning data into the backup file.

Process 300 is shown to further include establishing a communications link between the main control unit and a portable data storage device physically separate from the main control unit (step 310) and copying the backup file to the portable data storage device (step 312). In some embodiments, the portable data storage device may communicate with the main control unit via a USB connection. For example, a user may insert the portable data storage device into a USB port of the main control unit. In other embodiments, the portable data storage device may be inserted into a memory card slot or other hardwired data communications interface of the main control unit (e.g., a direct connection).

In some embodiments, the portable data storage device may be physically separate from the main control unit. In other words, the portable data storage device and the main control unit are physically separable components. However, the portable data storage device may be physically proximate to the main control unit when step 310 is performed. For example, the portable data storage device may be inserted into a USB port or memory card slot of the main control unit. Such physical proximity does not disqualify a portable data storage device as a "physically separate" component. The backup file may be copied with additional metadata identifying the device type, date and time of backup, device status, or other information relating to the provisioning data contained therein. In some embodiments, the main control unit may display a status of the backup process (e.g., via an onboard user interface device of the main control unit) throughout process 300.

Figure 10B:
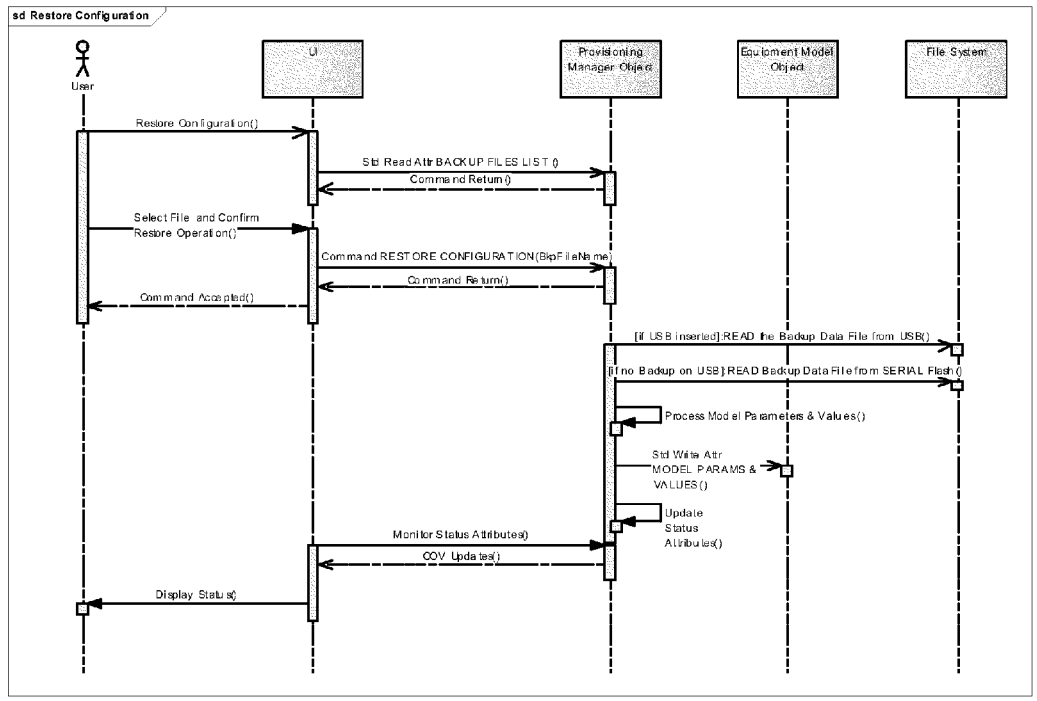
FIG. 10B is a sequence diagram illustrating the process described in FIG. 10A, according to an exemplary embodiment.

Referring now to FIGS. 10A-10B, a flowchart of a process 400 for restoring provisioning data from a backup file to a system of BMS devices (FIG. 10A) and a corresponding sequence diagram (FIG. 10B) are shown, according to an exemplary embodiment. Process 400 may be used to restore the backup file created using process 300 to the same system of BMS devices from which the backup file was generated (e.g., the main control unit, the auxiliary control unit, etc.). In some embodiments, process 400 may be performed in response to a user selection of a "restore configuration" menu option presented via the user interface element. The user interface element may relay the "restore configuration" command to a provisioning manager object of the main control unit.

Process 400 is shown to include identifying the first provisioning data in the backup file on the portable data storage device using the first metadata (step 402) and identifying the second provisioning data in the backup file on the portable data storage device using the second metadata (step 404). The first provisioning data may be targeted for the main control unit and the second provisioning data may be targeted for the auxiliary control unit. Although only two devices are described in reference to FIGS. 10A-10B, process 400 may identify any number of provisioning data targeted for any number of BMS devices in various alternate embodiments.

In some embodiments, the first and second provisioning data may be identified by a provisioning manager (e.g., provisioning manager 140) using metadata associated with each provisioning data. The provisioning manager may receive system information such as currently active devices, current firmware versions, current hardware versions, and/or other static or dynamic configuration data from the auxiliary control unit. In some embodiments, the provisioning manager may receive system information from a plurality of remote BMS devices. The system information may represent a current "system version" of the BMS.

In some embodiments, the provisioning manager may identify the first provisioning data and the second provisioning data by comparing the current "system version" with the version identifiers included in the backup file metadata (e.g., TOC metadata, provisioning partition metadata, etc.). In some embodiments, the provisioning manager may identify the first provisioning data and the second provisioning data by comparing device identifiers included in the associated metadata with identity attributes of the main control unit and the auxiliary control unit. The provisioning manager may receive identity and other configuration attribute information and/or version information from an equipment model module (e.g., equipment model module 144) of the main control unit.

Still referring to FIG. 10A-10B, process 400 is shown to further include extracting the first and second provisioning data from the first and second identified partitions (step 406). In some embodiments, the provisioning data may be received from the portable data storage device in a compressed format. Step 406 may include decompressing the received provisioning data so that the data may be read and used by other components of the building management system. In some embodiments, extracting the provisioning data may involve copying the provisioning data from the portable data storage device to a memory device (e.g., memory 160) of the main control unit. In some embodiments, step 406 may include verifying an integrity of the provisioning data as described with reference to step 210 of process 200.

Still referring to FIG. 10A-10B, process 400 is shown to further include applying the first provisioning data to a memory device of the main control unit and applying the second provisioning data to the auxiliary control unit via the communications network (step 408). Applying the first provisioning data to a memory device of the main control unit may include copying the provisioning data from memory module 160 to an appropriate data module based on the type of provisioning data. For example, runtime configuration data may be copied to runtime configuration data module 139, factory default data may be copied to factory default data module 140, application archive data may be copied to application data module 134. Each data module may be located within a same physical memory module or different physical memory module within the main control unit. Applying the first provisioning data to the memory device of the main control unit may include identifying, mapping, and unlocking the destination data modules and copying the first provisioning data to such modules.

In some embodiments, the extracted provisioning data includes main firmware data for the main control unit. The main control unit may be unable to directly copy such data to main firmware module 132 while main firmware module 132 is currently locked for execution (e.g., by processor 125). To update main firmware module 132, the main firmware provisioning data may be copied to backup main memory module 163. Boot firmware module 133 may be configured to copy the updated firmware from backup main module 163 to main firmware module 132 during the next boot sequence.

Applying the second provisioning data to the auxiliary control unit via the communications network may include establishing a download communication session with the auxiliary control unit and then downloading or transmitting the decompressed provisioning data from the main control unit to the auxiliary control unit. Advantageously, the second provisioning data may be applied to the auxiliary control unit via an existing communications network within the building management system (e.g., a BACnet SA network). This advantage eliminates the need for a more complicated provisioning process involving higher level communication networks.

In some embodiments, the second provisioning data may be applied to the auxiliary control unit using currently operational provisioning protocols to ensure that the auxiliary control unit properly receives and applies the transmitted provisioning data. In some embodiments, the second provisioning data may be communicated along with the second metadata. The second metadata may include an image name string (e.g., image name string 86). The image name string may specify a particular device name and/or device index to ensure that the second provisioning data is properly applied to the auxiliary control unit.

In some embodiments, step 408 includes updating attributes of the equipment model object to reflect the newly applied provisioning data. Such attributes may include version information, identity information, configuration settings, or other system information relating to the newly implemented "system version." In some embodiments, the main control unit may cause the local user interface to display a status of the restoration process throughout process 400.

Figure 11B:
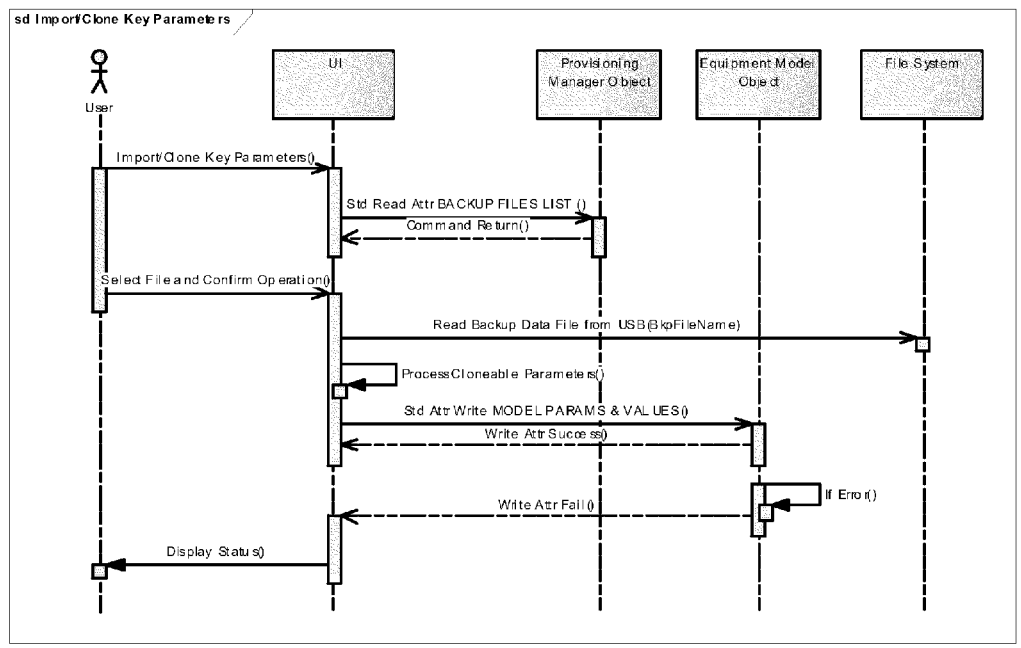
FIG. 11B is a sequence diagram illustrating the process described in FIG. 11A, according to an exemplary embodiment.

Referring now to FIGS. 11A-11B, a flowchart of a process 500 for cloning provisioning data from a backup file to a system of BMS devices (FIG. 11A) and a corresponding sequence diagram (FIG. 11B) are shown, according to an exemplary embodiment. Process 500 may be used to clone (e.g., copy, duplicate, etc.) the backup file created using process 300 to a system of BMS devices other than the system from which the backup file was generated. In other words, process 500 may be used to quickly and easily duplicate an entire set of BMS system data (e.g., firmware data, application data, configuration data, etc.) to another system of networked BMS devices.

In some embodiments, the other system of BMS devices may include another main control unit (i.e., "the other main control unit") and another auxiliary control unit (i.e., "the other auxiliary control unit"). The other main control unit may be configured in the same manner as the original main control unit. For example, the other main control unit may include a provisioning manager, an equipment model module, a file system module, a local user interface, and/or other components as described with reference to FIG. 7. The other auxiliary control unit may be connected with the other main control unit via another communications network as described with reference to FIG. 2.

Advantageously, process 500 may be used to clone system data from a first set of BMS devices to a second set of BMS devices regardless of whether the second system exactly matches the first system. For example, in some implementations, the second system of BMS devices may include additional devices not present in the first system. In other implementations, the second system of BMS devices may not include some devices present in the first system. The partitioned architecture of the backup file may facilitate some partitions to be extracted and applied to BMS devices in the second system (e.g., to devices of the second system matching devices of the first system) without affecting non-matching devices.

In some embodiments, process 500 may be performed in response to a user selection of an "import/clone data" menu option presented via a user interface element of the other main control unit. In some embodiments, the user interface element may be a local hardware interface (e.g., similar to user interface 115). In other embodiments, the user interface element may be a user interface module or application (e.g., similar to user interface module 135). The user interface module may receive input signals from a local hardware user interface.

In response to a user selection of the "import/clone data" menu option, the other main control unit may scan the portable data storage device for available backup files (e.g., package files, backup files, etc.) containing provisioning data and metadata. After scanning the portable data storage device, a list of available backup files may then be presented via the user interface element. In some embodiments, a user may select a backup file from the presented list to proceed with the importation process. In other embodiments, a backup file may be automatically selected by the other main control unit. After a backup file is selected (e.g., by a user or automatically), the user interface element may send an "import/clone data" command to a provisioning manager object of the other main control unit. The "import/clone data" command may instruct the provisioning manager object to proceed with the importation process using the provisioning data contained in the selected backup file. In some embodiments, the selectable menu options may allow a user to clone/import only configuration data, only application data, only firmware data, or any combination thereof.

Process 500 is shown to include identifying in the backup file first provisioning data targeted for the other main control unit using metadata associated with the first provisioning data (step 502) and identifying in the backup file second provisioning data targeted for the other auxiliary control unit using metadata associated with the second provisioning data (step 504). In some embodiments, the first and second provisioning data may be identified by a provisioning manager of the other main control unit (i.e., the main control unit of the second BMS). In some embodiments, the provisioning manager may identify one or more supplemental provisioning data in addition to the first and second provisioning data (e.g., third provisioning data, fourth provisioning data, etc.) based on the devices actually present in the second BMS (e.g., as identified by the equipment model module). The provisioning manager may receive identity attribute information and/or version information from an equipment model module of the other main control unit. The combined information from all BMS devices may represent a current "system version" of the second BMS.

In some embodiments, the provisioning manager may compare a the "system version" of the second BMS with the version information and identity information included in the metadata of the identified backup file. For example, the provisioning manager may identify the first provisioning data and the second provisioning data by comparing version identifiers included in the metadata with version attributes of existing provisioning data used by the other main control unit and the other auxiliary control unit. The provisioning manager may identify the first provisioning data and the second provisioning data by comparing device identifiers included in the metadata with identity attributes of the other main control unit and the other auxiliary control unit.

Process 500 is shown to further include extracting the first and second provisioning data from the backup file (step 506). Advantageously, the architecture of the backup file may facilitate the extraction of identified provisioning data (e.g., the first and second provisioning data, provisioning data corresponding to BMS devices in the second system, etc.) without requiring other data to be downloaded and/or processed. For example, the second BMS may include fewer devices than the first BMS. Accordingly, the backup file may include provisioning data corresponding to devices of the first BMS which are not present in the second BMS. In step 506, the provisioning manager may selectively extract the identified provisioning data without downloading and/or processing non-identified provisioning data. This advantage may reduce the data processing and bandwidth resources used to complete process 500 and improve the efficiency of the provisioning process.

In some embodiments, the second BMS may include devices not present in the first BMS. Accordingly, the backup file may not include provisioning data corresponding to every device of the second BMS. In step 506, the provisioning manager may still download and/or extract the identified provisioning data notwithstanding the backup file containing provisioning data for only a subset of devices in the second BMS.

Still referring to FIG. 11, process 500 is shown to further include applying the first provisioning data to a memory device of the other main control unit and applying the second provisioning data to the other auxiliary control unit via the other communications network (step 508). Applying the first provisioning data to a memory device of the other main control unit may include copying the provisioning data from a memory module of the other main control unit to an appropriate data module of the other main control unit based on the type of provisioning data. For example, runtime configuration data may be copied to a runtime configuration data module of the other main control unit, factory default data may be copied to a factory default data module of the other main control unit, application archive data may be copied to an application data module of the other main control unit, etc.

Applying the second provisioning data to the auxiliary control unit via the communications network may include establishing a communication session with the auxiliary control unit and pushing the provisioning data from the other main control unit to the other auxiliary control unit. Advantageously, the second provisioning data may be applied to the other auxiliary control unit via an existing communications network within the second BMS (e.g., a BACnet SA network). This advantage eliminates the need for a more complicated provisioning process involving higher level communication networks. In some embodiments, the second provisioning data may be applied to the other auxiliary control unit using currently operational provisioning protocols to ensure that the other auxiliary control unit properly receives and applies the transmitted provisioning data. In some embodiments, the second provisioning data may be communicated along with the second metadata. The second metadata may include an image name string (e.g., image name string 86). The image name string may specify a particular device name and/or device index to ensure that the second provisioning data is properly applied to the other auxiliary control unit.

The systems and methods described herein may be used to automatically and conveniently update, backup, restore, or clone provisioning data for a system of BMS devices using a portable data storage device. The BMS devices may be used to control a HVAC system, a lighting system, a water system, a security system, an elevator system, or any other type of building control system. In various embodiments, the provisioning processes may be initiated via an onboard user interface of one of the BMS devices (e.g., the main control unit). Advantageously, each provisioning process may be entirely driven by a provisioning manager of the main control unit. The provisioning manager may control the receipt of provisioning data from a portable data storage device, process the provisioning data, and apply the provisioning data to both the main control unit and one or more auxiliary units without assistance from a third device. For example, the provisioning process may not be PC-driven or PC-based. A user may interact with the provisioning manager via an onboard user interface of the main control unit. This advantage eliminates the need for a separate user interface for monitoring and/or controlling the provisioning process.

In various embodiments, the portable data storage device does not include any type of user interface (e.g., a keyboard, a touch screen, a monitor, a button, a display, etc.). For example, the portable data storage device may be a USB flash drive, a memory card, or other device without a user interface. In various embodiments, the portable data storage device may be a simple memory device without any processing or control functionality. For example, in some embodiments, the portable data storage device is not a laptop, a tablet, a smart phone, a PDA, or any other type of portable computing device. The portable data storage device may simply provide a source of data for the main control unit.

The provisioning manager may control the receipt of data from the portable data storage device using a file system module of the main control unit. The provisioning manager may extract, download, pull, or otherwise actively acquire provisioning data from the portable data storage device. The provisioning manager of the main control unit may exclusively control the receipt of data from the portable data storage device. In other words, the portable data storage device may not exercise logical control over the data contained therein. The stored data may be read freely by the main control unit upon establishing a communications link with the portable data storage device. In some embodiments, the provisioning data may not be "sent" or "transmitted" to the main control unit from the portable data storage device. Rather, the data is "extracted" or "pulled" from the portable data storage device by the main control unit.

In some embodiments, the main control unit extracts provisioning data directly from the portable data storage device without any intermediate components. For example, the portable data storage device may "plug in" to the main control unit (e.g., via a USB port, an Ethernet connection, a memory card slot, etc.) rather than transferring data to the main control unit over a communications network. A user (e.g., a service technician) may physically transport the portable data storage device to the main control unit. The user may initiate the provisioning processes by directly connecting the portable data storage device to the main control unit and selecting a menu option via the onboard user interface of the main control unit.

In various embodiments, the systems and methods described herein are not PC-driven or PC-based. For example, the described provisioning processes may be initiated and controlled by interacting directly with the main control unit via an onboard hardware user interface. A separate user interface device (e.g., a PDA, a laptop, a tablet, a smart phone, etc.) is not required to initiate or control the described processes. In some embodiments, a user may interact with the described systems only via an onboard user interface of the main control unit. In some embodiments, the various provisioning processes may be accomplished using only the main control unit, the portable data storage device, and one or more auxiliary control units. Additional devices are not required to initiate, control, monitor, or confirm the provisioning processes. Advantageously, this facilitates the implementation of the described provisioning processes on a local device level (e.g., by directly interacting with the main control unit) rather than on a supervisory or network level.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for updating building equipment, the system comprising:
    a main control unit including a processing circuit, a memory device, and a data communications interface;
    an auxiliary control unit connected with the main control unit via a communications network; and
    a portable data storage device physically separate from the main control unit and having an update file stored therein, wherein the update file includes a plurality of partitions, each partition containing provisioning data for a programmable component of the main control unit or the auxiliary control unit and associated metadata;
    wherein the processing circuit comprises a provisioning manager configured to identify a first partition of the update file containing first provisioning data targeted for the main control unit using first metadata associated with the first partition and to identify a second partition of the update file containing second provisioning data targeted for the auxiliary control unit using second metadata associated with the second partition;
    wherein the processing circuit is configured to extract the provisioning data from the identified partitions and to apply or update the extracted provisioning data to the auxiliary control unit via the communications network and to the memory device of the main control unit.

2. The system of claim 1, wherein the main control unit includes a user interface element,
    wherein the main control unit is configured to identify the partitions, extract the provisioning data, and apply the extracted provisioning data to the auxiliary control unit in response to an input received via the user interface element.

3. The system of claim 1, wherein the main control unit extracts the provisioning data directly from the portable data storage device without an intermediate communications network between the main control unit and the portable data storage device.

4. The system of claim 1, wherein the portable data storage device does not include a user interface element and wherein the main control unit exercises exclusive control over the extraction of the provisioning data from the identified partitions without assistance from another device.

5. The system of claim 1, wherein each of the plurality of partitions contains a single type of provisioning data selected from a group consisting of: executable firmware data, executable application data, and configuration data; and
wherein each of the plurality of partitions contains provisioning data targeted for a single control unit selected from a group consisting of: the main control unit and the auxiliary control unit.

6. The system of claim 1, wherein the metadata for each partition includes a device identifier indicating a device to which the provisioning data contained in the same partition is targeted,
wherein the provisioning manager identifies the partitions containing provisioning data targeted for the main control unit and the auxiliary control unit by comparing the device identifiers with identity attributes of the main control unit and the auxiliary control unit.

7. The system of claim 1, wherein the metadata for each partition further includes a version identifier indicating a version of the provisioning data contained in the same partition,
wherein the provisioning manager identifies the partitions containing updated provisioning data targeted for the main control unit and the auxiliary control unit by comparing the version identifiers with version attributes of existing provisioning data used by the main control unit and the auxiliary control unit.

8. The system of claim 1, wherein the metadata for each partition includes validity metadata,
wherein the provisioning manager is configured to validate the extracted provisioning data by generating a validity code based on the extracted provisioning data and comparing the generated validity code with the validity metadata.

9. A method for updating building equipment, the method comprising:
establishing a communications link between a main control unit and a portable data storage device physically separate from the main control unit, wherein the portable data storage device includes an update file having a plurality of partitions, each partition containing provisioning data and associated metadata;
identifying a first partition of the update file containing first provisioning data targeted for a programmable component of the main control unit, wherein the first partition is identified by a provisioning manager of the main control unit using first metadata associated with the first partition;
identifying a second partition of the update file containing second provisioning data targeted for a programmable component of an auxiliary control unit connected with the main control unit via a communications network, wherein the second partition is identified by the provisioning manager using second metadata associated with the second partition;
extracting the first and second provisioning data from the first and second identified partitions; and
applying or updating the first provisioning data to a memory device of the main control unit and applying or updating the second provisioning data to the auxiliary control unit via the communications network.

10. The method of claim 9, further comprising:
receiving an input via a user interface element of the main control unit,
wherein the provisioning manager identifies the first and second partitions, extracts the first and second provisioning data from the first and second identified partitions, and applies or updates the extracted provisioning data to the memory device of the main control unit and to the auxiliary control unit connected with the main control unit via the communications network in response to the input received via the user interface element.

11. The method of claim 9, wherein the communications link between the main control unit and the portable data storage device is a direct link without any intermediate components, wherein the portable data storage device does not include a user interface element, and wherein the main control unit exercises exclusive control over the extraction of the provisioning data from the identified partitions without assistance from another device.

12. The method of claim 9, wherein each of the plurality of partitions contains a single type of provisioning data selected from a group consisting of: executable firmware data, executable application data, and configuration data; and
wherein each of the plurality of partitions contains provisioning data targeted for a single control unit selected from a group consisting of: the main control unit and the auxiliary control unit.

13. The method of claim 9, wherein the metadata for each partition includes a device identifier indicating a device to which the provisioning data contained in the same partition is targeted, the method further comprising:
comparing the device identifiers with identity attributes of the main control unit and the auxiliary control unit,
wherein the provisioning manager identifies the partitions containing provisioning data targeted for the main control unit and the auxiliary control unit based on the comparison.

14. The method of claim 9, wherein the metadata for each partition includes a version identifier indicating a version of the provisioning data contained in the same partition, the method further comprising:
comparing the version identifiers with version attributes of existing provisioning data used by the main control unit and the auxiliary control unit,
wherein the provisioning manager identifies the partitions containing updated provisioning data for the main control unit and the auxiliary control unit based on the comparison.

15. A method for provisioning building equipment, the method comprising:
identifying first provisioning data currently in use by a main control unit, wherein the first provisioning data is identified by a provisioning manager of the main control unit;
identifying second provisioning data currently use by an auxiliary control unit connected with the main control unit via a communications network, wherein the second provisioning data is identified by the provisioning manager of the main control unit;
receiving, into a memory device of the main control unit, the second provisioning data from the auxiliary control unit;
generating first metadata based on the first provisioning data and second metadata based on the second provisioning data;
generating a backup file containing the first provisioning data, the first metadata, the second provisioning data, and the second metadata;
establishing a communications link between the main control unit and a portable data storage device physically separate from the main control unit; and
copying the backup file to the portable data storage device.

16. The method of claim 15, further comprising:
receiving an input via a user interface element of the main control unit, wherein the provisioning manager identifies the first and second provisioning data, receives the second provisioning data, generates the first and second metadata, generates the backup file, and applies the backup file to the portable data storage device, in response to the input received via the user interface element.

17. The method of claim 15, wherein the first and second provisioning data are selected from a group consisting of: executable firmware data, executable application data, and configuration data; and
wherein the first and second metadata include a device identifier indicating a device to which the associated provisioning data is targeted.

18. The method of claim 15, wherein the communications link between the main control unit and the portable data storage device is a direct link without any intermediate components, wherein the portable data storage device does not include a user interface element, and wherein the main control unit exercises exclusive control over data transfer between the main control unit and the portable data storage device without assistance from another device.

19. The method of claim 15, further comprising:
restoring the first and second provisioning data from the backup file to the main control unit and the auxiliary control unit by performing steps comprising:
identifying the first provisioning data contained in the backup file on the portable data storage device, wherein the first provisioning data is identified by the provisioning manager using the first metadata;
identifying the second provisioning data contained in the backup file on the portable data storage device, wherein the second provisioning data is identified by the provisioning manager using the second metadata;
extracting the first and second provisioning data from the backup file; and
applying the first provisioning data to a memory device of the main control unit and applying the second provisioning data to the auxiliary control unit via the communications network.

20. The method of claim 15, further comprising:
cloning the first and second provisioning data from the backup file to another main control unit and another auxiliary control unit connected with the other main control unit via another communications network unit by performing steps comprising:
identifying in the backup file on the portable data storage device first provisioning data targeted for the other main control unit, wherein the first provisioning data is identified by a provisioning manager of the other main control unit using metadata associated with the first partition;
identifying in the backup file stored on the portable data storage device second provisioning data targeted for the other auxiliary control unit, wherein the second provisioning data is identified by the other provisioning manager using second metadata associated with the second partition;
extracting the first and second provisioning data from the backup file; and
applying the first provisioning data to a memory device of the other main control unit and applying the second provisioning data to the other auxiliary control unit via the other communications network.

* * * * *